(12) United States Patent
Sung et al.

(10) Patent No.: US 11,563,575 B2
(45) Date of Patent: Jan. 24, 2023

(54) COMMUNICATION NODE, METHOD OF OPERATING THEREOF AND COLLABORATIVE SYSTEM

(71) Applicant: Monoly, Inc., San Jose, CA (US)

(72) Inventors: Ki Woon Sung, Busan (KR); Jong Hoon Keum, Seoul (KR); Yoon Ho Kim, Suwon-si (KR); Moon Jung Choi, Busan (KR)

(73) Assignee: Monoly, Inc., San Jose, CA (US)

( * ) Notice: Subject to any disclaimer, the term of this patent is extended or adjusted under 35 U.S.C. 154(b) by 94 days.

(21) Appl. No.: 17/149,865

(22) Filed: Jan. 15, 2021

(65) Prior Publication Data
US 2021/0258152 A1 Aug. 19, 2021

(51) Int. Cl.
*H04L 9/14* (2006.01)
*H04L 9/08* (2006.01)
*H04L 9/32* (2006.01)
*H04L 9/00* (2022.01)

(52) U.S. Cl.
CPC .............. *H04L 9/14* (2013.01); *H04L 9/0825* (2013.01); *H04L 9/0869* (2013.01); *H04L 9/3215* (2013.01); *H04L 9/3297* (2013.01); *H04L 9/50* (2022.05)

(58) Field of Classification Search
None
See application file for complete search history.

(56) References Cited

U.S. PATENT DOCUMENTS

| 10,742,422 | B1 * | 8/2020 | Jarjoui ................ H04L 9/085 |
| 11,049,128 | B1 * | 6/2021 | Olson ................. G06Q 20/02 |
| 2011/0002405 | A1 * | 1/2011 | Raveendran .......... H04H 60/41 455/62 |
| 2015/0372813 | A1 * | 12/2015 | Brand .................. H04L 9/0841 713/155 |
| 2016/0292680 | A1 * | 10/2016 | Wilson, Jr. ............ G06Q 40/06 |

(Continued)

FOREIGN PATENT DOCUMENTS

| CN | 109783464 A | * | 5/2019 | |
| WO | WO-2019031829 A1 | * | 2/2019 | ............... H04L 1/00 |

*Primary Examiner* — Benjamin E Lanier
(74) *Attorney, Agent, or Firm* — McLean IP Global; Jason Y. Pahng

(57) ABSTRACT

The present invention relates to a communication node, a method of operating the same, and a collaborative system. In an example of the present invention, there may be provided an operation method of a first communication node (a transmission node) comprising: a step of confirming whether data is to be transmitted to the receiving side communication node by a transmitting side communication node among communication nodes connected to each other on the network; a step for generating first control information for verifying authentication and integrity of the data; a step for generating a first control information including information for authenticating and verifying integrity of the data to be transmitted by the transmitting side communication node; a step for sharing the first control information with at least one or more participating communication nodes including the receiving side communication node through a channel formed in a block chain network; and a step for transmitting a message including the data through a channel formed in a network different from the block chain network.

19 Claims, 13 Drawing Sheets

(56) References Cited

U.S. PATENT DOCUMENTS

| | | | |
|---|---|---|---|
| 2019/0081799 A1* | 3/2019 | Uhr | H04L 9/3239 |
| 2020/0242600 A1* | 7/2020 | Stack | H04W 12/062 |
| 2021/0058353 A1* | 2/2021 | Creech | H04L 51/212 |

* cited by examiner

FIG. 2b

| Timestamp | 1 | 2 | 3 | 4 | 5 | 6 | 7 | 8 | ... |
|---|---|---|---|---|---|---|---|---|---|
| ACC | * | * | * | * | * | * | * | * | ... |
| Payload (t) | s1-e1 | e2 | e2 | e2 | | e3 | e3 | | ... |
| FSP | * | * | * | * | * | * | | | |
| BWR | * | * | * | * | * | * | | | |
| PAC | * | * | * | * | * | * | * | * | ... |

MAX_PAYLOAD_SIZE

COMMUNICATION NODE, METHOD OF OPERATING THEREOF AND COLLABORATIVE SYSTEM

CROSS-REFERENCES TO RELATED APPLICATION

The present application claims the benefit of Korean application number 10-2020-0005502, filed on Jan. 15, 2020, which is herein incorporated by reference in its entirety.

BACKGROUND OF THE INVENTION

1. Field

The present invention relates to network communication technology, and more particularly, to a trust-based communication node, a method of operating the same, and a collaborative system.

2. Description of the Related Art

The importance of collaboration becomes more important between various performers, for example between members within a company to improve productivity or between companies, between research groups, or between individuals for open innovation. Accordingly, various collaboration tools using information processing and communication technologies have been developed and used so that the actors or members may quickly and efficiently process tasks for a teams or a projects. The collaboration tools also provide additional tools that improve the collaboration efficiency, for example, document creator (for example, a word processor) or a calendar program for schedule management as well as the two major communication tools such as e-mail service and messenger program within the company. These tools make the collaboration between the participants to be faster and more efficient.

As for the messenger platform used as a variety of collaboration tools, the service providing method is generally based on the client/server architecture. These messenger platforms may be classified into an On-premise type platform and a SaaS/Cloud type platform. As the On-premises type collaboration tool service can be utilized only within a specific organization, there may be confliction when an external member is required to utilize the service, the reconstruction cost for communicating with an external member or external organization is very high, and the connection complexity may increase. Furthermore, for the On-premises type collaboration, there exists a problem that it is difficult to determine where to store a master table for members of the organization.

In contrast, the SaaS/Cloud type platform may have the advantage that the build cost is relatively cheaper than the on-premises type platform and it can be easily connected with other organizations. However, for the SaaS/Cloud type platform, as data of a user or enterprise is stored in the platform service provider's data storage system or the data be delivered to the other party inevitably through the service provider's data storage system. Thus, for the SaaS/Cloud type platform, it may be difficult to use in specialized companies that need to keep enterprise data or customer data confidential.

The problems of the service of the collaboration tool based on the above-described client/server model may be improved through direct connection such as peer to peer P2P network between users' computers or enterprise servers as a participant for the communication platform. Since such a P2P network configuration nodes, for example, multiple users' terminals may form a network between the computers, and the network may be maintained and operated by active participation of the users computers which may act as unspecified multiple beneficiaries. In generally, for the P2P network configuration nodes, prerequisite conditions such as pre-authentication, identification (for example, identification of the owner), and SLA (Service Level Agreement) are not assigned. Accordingly, when the P2P network configuration is applied to the collaboration tool for processing enterprise-level data, there is a problem that it is difficult to ensure data reliability, confidentiality, service stability, and availability.

For the purpose of enhancing data reliability, service stability and availability, public block chain technology is being introduced and developed. In the public block chain, data reliability may be enhanced by enabling direct transactions between users for virtual assets based on ledger data recorded in blocks, and nodes participating in the P2P network have economic motives such as mining rewards, thereby improving service stability and availability. However, in a view of an enterprise business security or confidentiality, the fact that an enterprise data communicated with the participants is stored in or through servers of other organizations, for example, the node operators or unspecified individuals or entities, there is a risk of compliance violation occurrence or leakage of an enterprise business secret. Therefore, the public block chain technology may also have a limit in using the collaboration tool.

In addition, since the processing speed per second of the conventional enterprise block chain is thousands of transactions per second (TPS) based on a fixed delay of 1 second, it is suitable for use in a wider variety of businesses, and accordingly has been recently introduced in business fields such as finance and logistics. However, when hundreds of bytes of data are processed at thousands of TPS, information throughput may have a limit in real-time information exchange between the participating enterprises. For example, since the Hyperledger Fabric, which is an open-source based enterprise block chain communication tool, has a processing speed of 200 KB/s when processing a transaction of about 200 Bytes at about 1,000 TPS, there are a limit in using it for communication between the participating enterprises. In addition, for the Hyperledger Fabric, due to the limitation of the amount of data to be processed, the timeliness of information transmission may be also deteriorated.

In addition, when the ledger is updated based on the Execute-Order-Validate architecture as another enterprise block chain technologies, some Onchain data may be liable to be propagated to an unnecessary node in the order stage. For preventing the unnecessary propagation of the date, the original data may be encrypted. But even if it is encrypted, the data exchange pattern reflecting quantity of exchanged data, exchange timing, relationship between communicating nodes, etc.) may be exposed, which may cause security problems when dealing with sensitive enterprise data. In addition, in the case of off-chain data, there is no risk of exposure of data contents because it records the hash code rather than the encrypted original data. But, since the hash code exchange pattern is able to be exposed, it may be a problem for the enterprise communication tool with high security level.

SUMMARY OF THE INVENTION

The technological object to be achieved by the present invention is to provide a communication node which may enhance processing speed, capacity, and timeliness of data, and data reliability and confidentiality by preventing exposure of data itself and data exchange patterns, so that it may be applied to collaboration between various subjects for enterprise's purpose as well as individual' purpose.

In addition, other technological object to be achieved by the present invention is to provide a method of operating a communication node having the above-described advantages.

In addition, another technological object to be achieved by the present invention is to provide a collaborative system having the aforementioned advantages.

According to an example of the present invention, there may be provided a method of operating the first communication node comprising: a step of confirming data to be transmitted to a second communication node; a step for generating first control information for verifying authentication and integrity of the data; a step for sharing a first control information with at least one or more participating communication nodes including the second communication node through a channel formed in a block chain network; and a step for transmitting a message including the data through a channel formed in a network different from the block chain network.

In an example, the first control information may include at least any one of a public key of the first communication node; a first nonce value encrypted with the private key of the first communication node; a first timestamp value for the first control information; and an output value of a hash function having the data or segment of the data, the first nonce value, and a second nonce value included in the second control information for increasing the entropy of the first control information as input values. When there is no data to be transmitted, the data of the hash function or the segment of the data may be set to a null value.

In an example, a step for sharing a second control information for increasing entropy of the first control information with the participating communication nodes may be further included. The step for sharing the second control information may include a step for receiving the second control information from a third communication node of a service provider among the participating communication nodes, or a step for generating the second control information to transmit to the participating communication nodes.

In an example, the second control information may include at least any one of a seed value encrypted with a private key of any one of the participating communication nodes that provided the seed value; a public key of one communication node among the participating communication nodes that provided the seed value; a second nonce value generated by using the seed value; and a second timestamp value for transmission of the second control information. The second control information may further include a public key of the service provider; and the second nonce value encrypted with the public key of the service provider.

In an example, the message may include at least any one of a public key of the first communication node; a first timestamp value for the first control information; a second timestamp value for transmission of second control information corresponding to an entropy of the first control information; a value indicating whether it is the second control information provided by a service provider; a sequence starting number value for transmission of a segment of data; a sequence ending number value for transmission of the segment of data; a sequence number of the segment of data; a first nonce value generated by the first communication node or a second nonce value of the second control information; and the data or the segment of the data.

In an example, when the size of data to be transmitted to the first communication node is greater than or equal to a threshold, a step for dividing the data into a plurality of segments may be further included. Regardless of whether the data is transmitted or not, the first control information may be periodically or in a specific transmission pattern transmitted to at least one or more participating communication nodes including the first communication node through a first channel.

According to another example of the present invention, there may be provided a method of operating a second communication node comprising; a step for sharing at least one or more participating communication nodes including a first communication node, and the first control information for verifying authentication and integrity of data through a channel formed in a block chain network; a step for receiving a message including the data from the first communication node, through a channel formed in a network different from the block chain network, from any one communication node of the at least one or more participating communication nodes; a step for verifying the integrity of the data using the first control information.

In an example, a step for performing authentication for the subject that issued the first control information by using the first control information and the message, or a step for performing authentication on the transmitted first communication node transmitting the message by using the first control information and the message may be further included.

In another example of the present invention, there may be provided a method of operating a third communication node of a service provider comprising: a step for receiving a seed value for generating a random number from a first communication node or a second communication node; a step for generating second control information for verifying data authentication and integrity by using the received seed value; and a step for sharing the second control information with a plurality of participating communication nodes including the first communication node and the second communication node through a channel formed in the block chain network.

In an example, instead of the step for receiving a seed value for generating a random number from the first communication node or the second communication node, a step for generating a seed value for generating a random number may be further included.

In an example, the step for generating of the second control information may comprise a step for generating a nonce based on the seed; and may further include a step for checking whether the generated nonce has been previously used, and a step for encrypting the seed or a step for regenerating the seed when the generated nonce has been previously used.

According to another example of the present invention, there may be provided a first communication node comprising: a memory; and at least one processor, wherein the processor checks data to be transmitted to a second communication node, generates a first control information for verifying authentication and integrity of the data, shares the first control information with at least one or more participating communication nodes including the second communication node through a channel formed in the block chain network, and transmits a message including the data through a channel formed in other network different from the block chain network. The processor may share the second control information for increasing entropy of the first control information with the participating communication nodes. The processor may receive the second control information from a third communication node of a service provider among the participating communication nodes, or may generate the second control information and transmit the second control information to the participating communication nodes. When the size of data to be transmitted to the first communication node is greater than or equal to a threshold, the processor may divide the data into a plurality of segments. Regardless of whether the data is transmitted or not, the first control information may be periodically transmitted to at least one or more participating communication nodes including the first communication node through a first channel.

According to another example of the present invention, there may be provided a second communication node comprising: a memory; and at least one processor, wherein the processor shares the first control information for verifying authentication and integrity of data with at least one or more participating communication nodes including a first communication node through a channel formed in the block chain network, and receives a message including the data from the first communication node, through a channel formed in other network different from the block chain network, from any one of the at least one or more participating communication node, and performs a process for verifying the integrity of the data by using the first control information.

The processor may share the second control information for increasing entropy of the first control information with the participating communication nodes. Regardless of whether the data is transmitted or not, the first control information may be periodically or in a specific transmission pattern transmitted to at least one or more participating communication node including the first communication node through a first channel. The processor may perform authentication with respect to the subject that issued the first control information by using the first control information and the message. The processor may perform authentication with respect to the first communication node that has transmitted the message by using the first control information and the message.

According to another example of the present invention, the present invention comprises a memory; and at least one processor, wherein the processor may receive a seed value for generating a random number from a first communication node or a second communication node, and use the received seed value to generate second control information for verifying the integrity of the network, and share the second control information with a plurality of participating communication nodes including the first communication node and the second communication node through a channel formed in the block chain network. Instead of receiving a seed value for generating a random number from the first communication node or the second communication node, the processor may generate a seed value for generating a random number. The processor may generate a nonce based on the seed, check whether the generated nonce has been previously used or not, and regenerate a seed when the generated nonce has been previously used.

According to another example of the present invention, there may be provided a collaborative system comprising: a first communication node wherein the data to be transmitted is checked, the first control information is generated to verify authentication and integrity of the data, the first communication node is shared with at least one or more participating communication nodes including the second communication node through a channel formed in a block chain network, and a message including the data is transmitted through a channel formed in other network different from the block chain network; a second communication node wherein at least one or more participating communication nodes including the first communication node, and first control information for verifying the authentication and integrity of data are shared through a channel formed in the block chain network, and a message including the data is received from the first communication node, which is any one of the at least one or more participating communication node through a channel formed in a network different from the block chain network, and the integrity of the data is verified by using the first control information; and a third communication node wherein a seed value for generating a random number is received from the first communication node or the second communication node, a second control information corresponding to the first control information is generated by using the received seed value, and the second control information is shared with a plurality of participating communication nodes including the first communication node and the second communication node through a channel formed in the block chain According to an example of the present invention, the first communication node of transmitting side shares the first control information for verifying the authentication and integrity of data together with at least one or more participating communication nodes including the second communication node of the receiving side, through a first channel formed in the block chain network. The message including the data is transmitted through a second channel formed in the IP network, and the second communication node verifies integrity of the data by using the first control information. Therefore, data reliability may be maintained, timeliness limitations of processing speed, capacity and data, and exposure of data and data exchange patterns may be minimized.

Further, according to another example of the present invention, a method of operating a communication device having the above advantages may be provided.

Further, according to another example of the present invention, a data processing system having the above advantages may be provided.

BRIEF DESCRIPTION OF THE DRAWINGS

FIG. 2B illustrates a mapping relationship between first control information, second control information, and a message according to an example of the present invention.

DETAILED DESCRIPTION OF THE INVENTION

Figure 1:
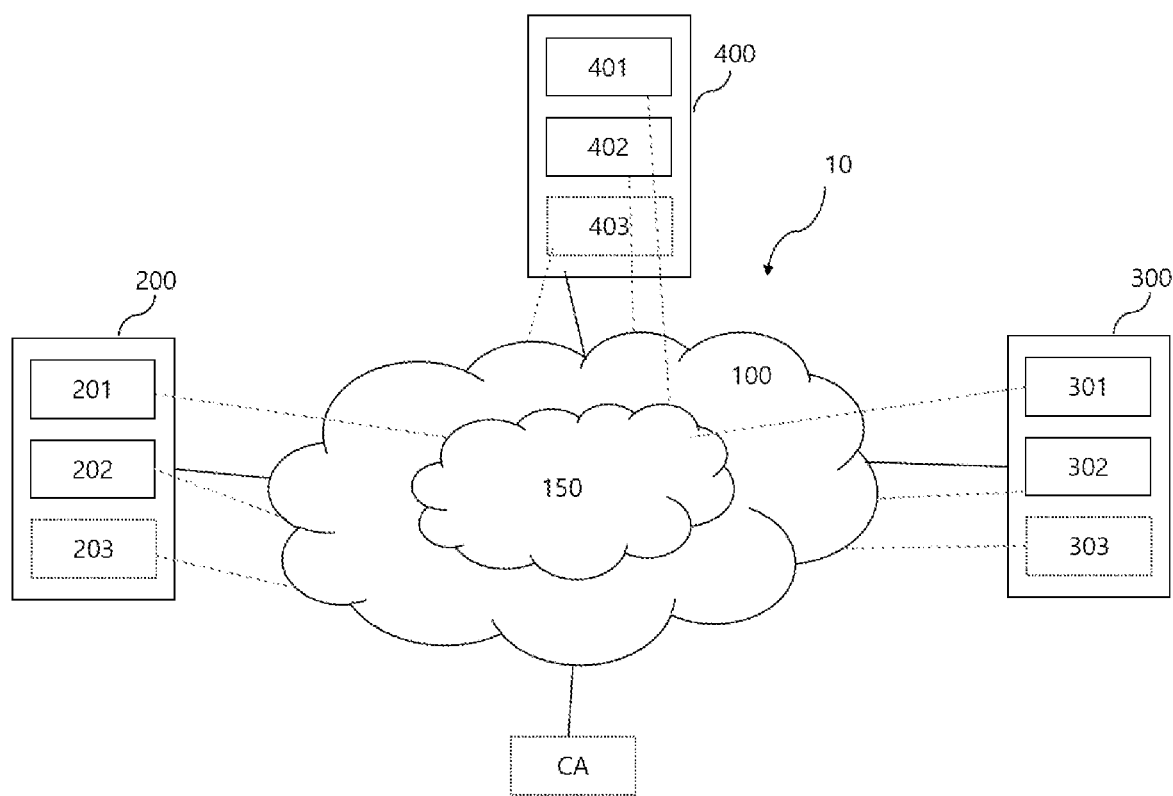
FIG. 1 illustrates a collaborative system based on a block chain according to an example of the present invention.

Hereinafter, the preferred examples of the present invention will be described in detail with reference to the accompanying drawings.

The examples of the present invention are provided to more fully describe the present invention to those having a common knowledge in the related art, and the following examples may be modified into various other forms, and the scope of the present invention is not limited to the following examples. Rather, these examples are provided to explain the present invention more clearly and completely, and to fully convey the spirit of the present invention to those skilled in the art.

In addition, in the following drawings, a thickness or a size of each layer is exaggerated for convenience and clarity of description, and the same reference numerals in the drawings refer to the same elements. As used herein, the term, "and/or" includes any one and all combinations of one or more of the listed items.

The terminology used herein is used to describe a specific example and is not intended to limit the present invention. As used herein, a singular form may include plural forms unless the context clearly indicates otherwise. Also, as used herein, the term such as "comprise" and/or "comprising" specifies the mentioned shapes, numbers, steps, actions, members, elements and/or the presence of these groups, and does not exclude the presence or addition of one or more other shapes, numbers, actions, members, elements and/or presence or addition of groups.

Although the terms, such as the first, the second, etc. are used herein to describe various members, components, regions, layers and/or portions, it is obvious that these members, components, regions, layers and/or portions are not defined by these terms. These terms are only used to distinguish one member, component, region, layer or portion from another region, layer or portion. Accordingly, the first member, component, region, layer or portion as described below may refer to the second member, component, region, layer or portion without departing from the teachings of the present invention.

Hereinafter, the examples of the present invention will be described with reference to the drawings schematically showing ideal examples of the present invention. In the drawings, for example, the size and shape of the members may be exaggerated for convenience and clarity of description, and in actual implementation, modifications of the illustrated shape may be expected. Accordingly, examples of the present invention should not be construed as limited to the specific shapes of the members or regions shown herein. Hereinafter, various examples of the present invention will be described in detail with reference to the accompanying drawings.

In the specification of the present invention, a first communication node refers to a transmitting node or a receiving node, a second communication node refers to a receiving node or a transmitting node corresponding to the first communication node, and a third communication node may refer to a communication node of a service provider providing a block chain platform.

FIG. 1 illustrates a collaborative system 10 based on a block chain according to an example of the present invention.

Referring to FIG. 1, the collaborative system 10 may include a first communication node 200, a second communication node 300, and a third communication node 400 connected to each other on the network 100. Optionally, the collaborative system 10 may further include a certification authority CA. The nodes 200, 300, and 400 connected to each other on the network 100 may also constitute the block chain network 150. In FIG. 1, a configuration wherein three communication nodes 200, 300, and 400 are connected to the network 100 and the block chain network 150 is illustrated, but at least four communication nodes or more nodes may be connected to the network 100 and the block chain network 150. The network 150 is an internet protocol network, i.e., IP network.

Each communication node may act as a block chain node as well as a client node. Optionally, a seed generation node for generating a seed value to the communication node may be further provided. For example, the first communication node 200 may function as a first block chain node 201 and a first client node 202, and may optionally also be operated as a seed generation node 203. Likewise, the second communication node 300 may function a second block chain node 301 and a second client node 302, and optionally may be operated as a seed generation node 203. A third communication node 400 may function a third block chain node 401 and a third client node 402, and optionally may be operated as a seed generation node 403. In an example, when a certificate authority CA generates and provides a public key as a main organization, and provides a seed value to a corresponding communication node by generating a seed value, the seed generation node is omitted from the components of the corresponding communication node.

In addition, the block chain nodes 201, 301, 401, client nodes 202, 302, 402, and optionally seed generation nodes 203, 303, 403 of the corresponding communication node 200, 300, 400 may be implemented as a hardware module or a software module, a combination of hardware and software module in one device, or may exist as a discrete device, respectively. Corresponding communication nodes 200, 300, and 400 may be connected to the IP network 100 by receiving at least one an IP address or more.

The block chain nodes 201, 301, 401 of the corresponding communication node 200, 300, 400 may refer to users or computers of the block chain platform, and may store and share a full copy of the block chain ledger. In addition, the block chain nodes 201, 301, 401 of the corresponding communication nodes 200, 300, 400 may access the block chain network 150 configured in the IP network 100, and the true state of the ledger (true state: since a ledger is a record of transactions, the state of this ledger includes the first control information and the second control information to be described later) may be recorded or updated based on a consensus method or rule.

In an example, the block chain network 150 may be a permission type block chain in which only a permitted participating node is allowed to participate in the block chain network 150 to improve suitability for an enterprise block chain. In addition, it is preferable that the block chain network 150 may support processing of multi-block chain and parallel transactions. In this case, since the block chain network 150 is as an enterprise block chain, only allowed participating nodes may participate in the block chain network 150, and it is possible to form an organization within the block chain network 150 and to implement the sharing of different ledgers in logical channels.

In an example, the block chain network 150 may have a Hyperledger Fabric Architecture. In the block chain network 150, the ledger may consist of two distinct parts of a database, referred to as a block chain and a world state. The "block" is composed of a transaction set, and the block may be created/verified/updated by the block chain nodes 201, 301, and 401. These blocks may be linked via a chain, and inter-block chains may be linked with each other based on a hash. The world state may be a database representing the latest values of all keys included in the chain transaction log. The chain code may execute a transaction or specific program code based on the data in the entire state.

In an example, at this time, the operation of a specific program code is not limited, and when the data of the entire state is considered as input, as the output value according to the execution result of the chain code is a deterministic or predictable value, the same output value may always be generated for the same input data. Specifically, in an example of the present invention, when transmitting data between the transmitting and receiving communication nodes, the payloads transmitted between the transmitting and receiving communication nodes may be matched with each other by assigning a sequence to the payloads of the data. Accordingly, when the receiving communication node performs verification on the data based on the operation of the chain code, the execution result of the chain code according to the input may be always and consistently matched. By giving deterministic or predictable characteristics to the output value based on the execution result of the chain code according to these inputs, the operation of the chain code based on data (e.g., payload) transmitted through an unreliable channel to be described later may safely maintained.

In an example, the world state may change when the key value is changed (ownership transferred) or added (generated). As a result, since the current state of a key-value pair must be known and accordingly, changes may be made, the overall state may play an important role in the transaction flow. The block chain nodes 201, 301, and 401 may commit the latest values to the overall state of the ledger for each valid transaction included in the processed block. In an example, one logical ledger may be provided for each channel of the block chain network 150. All block chain nodes 201, 301, and 401 of the channel may maintain and manage their own copies of the ledger. The copy of the ledger may be kept consistent with the copies of all other nodes through the consensus of the block chain nodes 201, 301, and 401.

The block chain nodes 201, 301, and 401 may use a code which is referred to be a smart contract and called by a client application outside a block chain network, and the users may manage access and modification of a set of key-value pairs of the entire state by using the code. In the block chain network 150, the smart contract may have the same meaning as the chain code. The chain code may be installed on the block chain node and may be instantiated in multiple channels.

In addition, the transaction of the block chain occurs when the chain code (or smart contract) is installed or called, and an event in the block chain network 150, for example, a transmission event of the first control information and the second control information, may be transactions of the block chain. The transactions of the block chain may include requests to perform business logic in the block chain network 150 such as an instantiate transaction to install the chain code and an invoke transaction to call the already deployed chain code. The role of the calling transaction is a read/write of a ledger, and the instantiation transaction is a request to initiate and initialize a chain code in a channel. The instantiation serves to inform other block chain nodes of the chain code.

Unlike the block chain nodes 201, 301, and 401, the client nodes 202, 302, and 402 may be connected to the network 100 without creating/verifying/updating blocks based on a consensus between nodes, and may transmit and receive data through a TCP/UDP secure session procedure with other communication nodes through wire communication or wireless communication.

Figure 2A:
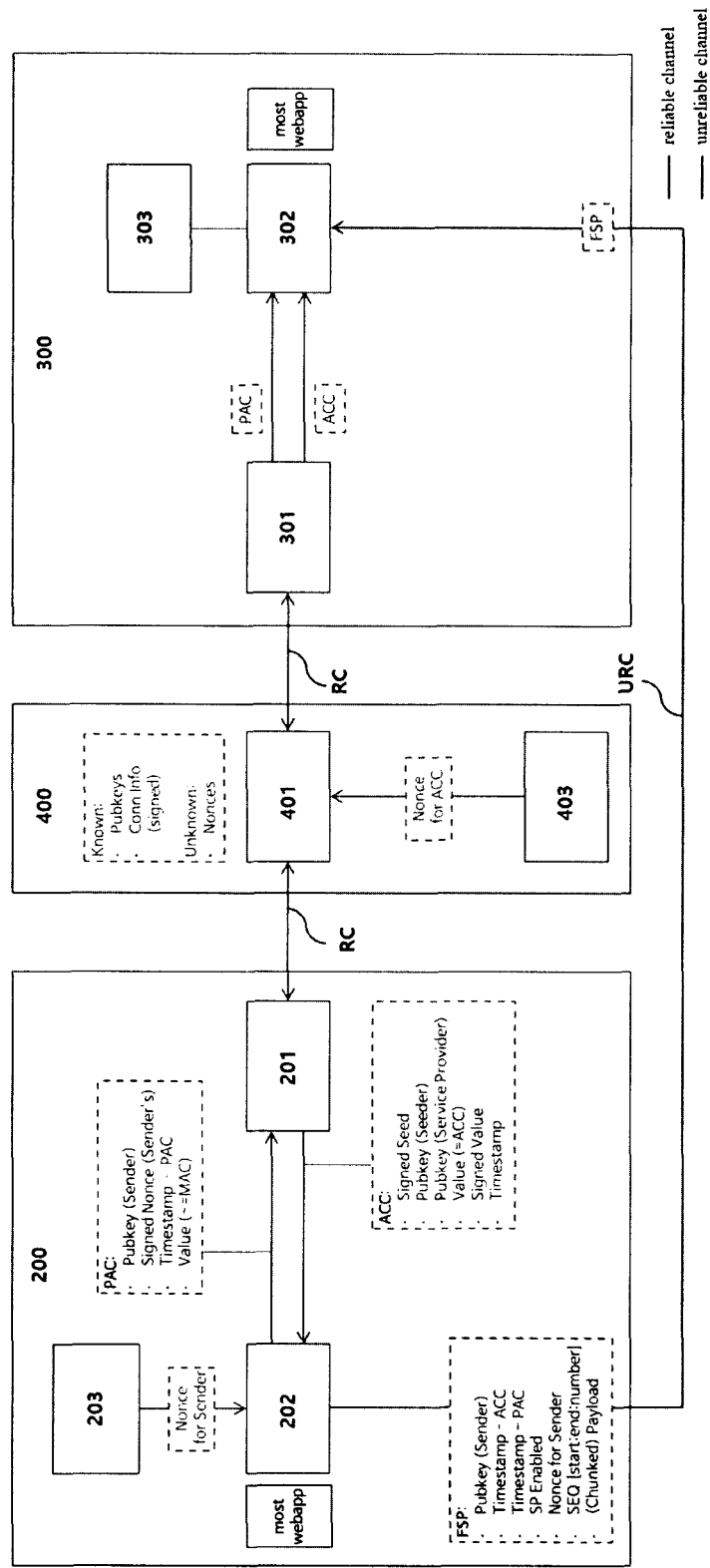
FIG. 2A illustrates a configuration of block chain according to an example of the present invention.

FIG. 2A illustrates a configuration of block chain according to an example of the present invention, and FIG. 2B illustrates a mapping relationship between first control information, second control information, and a message according to an example of the present invention.

Referring to FIG. 2A, a third communication node 400 as a service provider relaying between a first communication node 200 as a transmitting node, and a second communication node 300 as a receiving node is illustrated. These communication nodes 200, 300, 400 may separate the unreliable channel URC provided by the network 100 in FIG. 1, and the reliable channel RC formed by the block chain network 150 and exchange signals and information between these nodes 200, 300, 400. The unreliable channel URC may be, for example, a channel based on P2P networking on the general Internet. The reliable channel RC may be, for example, a channel based on P2P networking on a block chain network.

In an example, the unreliable channel URC may be a host-to-host TCP/UDP communication channel. The TCP may have a session establishment procedure and UDP may omit the session establishment procedure. In other words, the unreliable channel URC may refer to a channel formed on a block chain network allowing data sharing between multiple nodes, and all information transmission channels formed by host-to-host networking such as TCP/UDP. Specifically, the unreliable channel URC may include a channel formed by a general IP networking based on SSL/TLS, FTP, Secure FTP, SIP (Session Initiation Protocol), and DHT (Distributed Hash Table), and IP networking based on HTTP/HTTPS. The unreliable channel URC may be standardized and may transmit more data than the reliable channel RC by using the known bandwidth fairly and maximally, and though data exchange between the transmitting and receiving nodes of 1:1 connection is performed, the data may not be shared with nodes other than the transmitting and receiving node.

The reliable channel RC is an information delivery channel operated by a block chain scheme, and implement an information sharing even in a distributed environment by processing consensus between nodes. The reliable channel RC may be composed of any one of a public/private block chain, a consortium block chain, and an enterprise block chain. Preferably, the reliable channel RC may be composed of an enterprise block chain having a Hyperledger Fabric structure.

In addition, data capable of calculating back the payload may be not recorded on the reliable channel RC. Instead, a hash result value which sets a nonce value of the first control information PAC is set for the payload when recording the first control information PCC to be described later, as a key value, or a hash value for a payload related to a payload and a nonce value of the first control information PAC may be recorded.

In an example, the third block chain node 401 of the third communication node 400 may generate the second control information ACC, and may share the second control information ACC with the first block chain node 201 of the first communication node 200 and the second block chain node 301 of the second communication node 300 through a reliable channel RC. The second control information may be an authentication carrier code ACC may include any one of the seed information encrypted with the private key of the seed provider (signed seed), the public key (seeder) of the seed provider and the public key (service provider) of the service provider, an ACC value, a signed ACC value, and a timestamp of the second control information. The ACC value may be a nonce value generated based on a seed information generated by the third seed generation node 403.

If the first block chain node 201 of the first communication node 200 transmits the second control information ACC received from the third block chain node 400 to the first client node 202, or the first client node 202 requests the second control information ACC to the first block chain node 201 and then obtains the second control information ACC, the first client node 202 may use the second control information ACC to generate the first control information, and transmit the generated first control information PCC to the first block chain node 201. The first block chain node 201 may share the first control information PCC with the second block chain node 301 of the second communication node 300 and the third block chain node 401 of the third communication node 400, through a reliable channel RC. The first control information PCC may include a public key of the first communication node 200, a signed nonce generated by the first communication node 200, a timestamp of the first control information, a message authentication code value, for example, an output value of a hash function having a payload value (payload in FSP), nonce in FSP, and nonce in ACC as input values. In another example, when there is no data to be transmitted, a signed nonce value (Signed nonce) of the first control information PAC may be provided from the ACC value (value) or a signed ACC value (signed value) of the second control information.

In an example, the first communication node 200 may transmit data to the second client node 302 of the second communication node 300 by using an FSP message, which will be described later, through an unreliable channel URC. The FSP message may include a public key of the first communication node 200, a timestamp of an ACC, a timestamp of a PAC, an information confirming whether a service provider is an issuer or not, a nonce value generated by the first communication node 200, and a start time point and an end time point of a sequence, a sequence number, and divided or segmented data. In an example, when the size of the data to be transmitted is smaller than a predetermined threshold value, since division or segmentation of the data is unnecessary, the start time, end time, and sequence number of the sequence of the FSP message may be set to a null value or omitted depending on the size of the data to be transmitted.

The second block chain node 301 of the second communication node 300 may obtain the first control information PCC and the second control information ACC through the reliable channel RC, and may transmit the obtained first control information PCC and the second control information ACC to the second client node 302 or, as in the case of the first client 202, the second client node 302 may obtain the first control information PCC and the second control information ACC by requesting the first control information PCC and the second control information ACC to the second block chain node 301. The second client node 302 may receive the FSP message from the first client node 202 of the first communication node 200 through an unreliable channel URC.

At this time, the second client node 302 may perform authentication on the sender of the first control information by comparing a value obtained by decoding the singed nonce value of the first control information PCC with the public key of the first communication node 200 and the nonce value generated by the first communication node 200 of the FSP message.

In addition, the second client node 302 may obtain the second control information ACC mapped to the FSP message through the timestamp value of the ACC of the FSP message, and an authentication process may be performed for the sender of the FSP message by decrypting the nonce value generated by the first communication node 200 of the FSP message with the public key of the first communication node 200, and comparing a generated nonce value with the ACC value of the second control information ACC.

In an example, the second client node 302 may verify integrity of the data by using first control information PCC and second control information ACC received from the second block chain node 301, and the FSP message received from the client node 202 of the first communication node 200. Specifically, the second client node 302 may calculate an output value of a hash function using the nonce value of the first control information PCC, the nonce value of the second control information ACC, and the divided or segmented data of the FSP message as input values, and may verify data integrity by comparing an output value of the calculated hash function with a message authentication code value of the first control information PAC.

The nonce value of the first control information PCC/the second control information ACC, and the FSP message may be transmitted through a separate reliable channel RC and an unreliable channel URC, respectively, and since the FSP message at a transmitting side is generated by mapping the nonce value of the first control information PCC and the second control information ACC at the transmitting side, the second client node 302 at the receiving side may be required to recognize the mapping relationship between the nonce value of the first control information PCC and the second control information ACC received through the reliable channel RC and the FSP message received through the unreliable channel URC. With reference to FIG. 2B, the mapping relationship between the nonce value of the first control information PCC, the second control information ACC, and the FSP message will be described.

Referring to FIG. 2B, a timestamp may be provided to ensure a predecessor relationship for proving the event or an existence of a fact between the nodes. The timestamp may be an absolute time integer value, and as time increases, the timestamp value increases. The third block chain node 400 of the third communication node 400 may periodically generate the second control information ACC, and the periodically generated second control information ACC may be shared by the first block chain node 201 of the first communication node 200 and the second block chain node 301 of the second communication node 300 through a reliable channel RC. The second control information ACC may be generated for each timestamp (*—indicated time). For example, ACC corresponding to Timestamp 1 may be indicated as ACC1, and ACC corresponding to Timestamp N may be indicated as ACCN. Payload is expressed as the start point (s1, s2, s3) of each data generation and the end point (e1, e2, e3) of each data. The end point of data may be defined as a write request to the socket buffer or the last point at which transmission completion thereof is confirmed. The divided data or segment may be expressed as Chunk 1, Chunk 2, Chunk 3 . . . . The following settings such as Chunk 1=s1~e1, Chunk 2=s2~e2, and Chunk 3=s3~e3 may be defined. At this time, the Chunk 1 may occur only within one ACC cycle, the Chunk 2 may occur before and after one ACC occurs, and the Chunk 3 may occur before and after multiple occurrences.

In FIG. 2B, the case where the divided data (Chunked Payload) is three, and the FSP message occurs once, twice, and three times for Chunks 1, 2, and 3, respectively, are illustrated according to the example illustrated above. In connection with FSP, each of the divided data may be generated in the FSP protocol format of Table 3 to be described later. BWR (Buffer Write Request) is a time point at which the transmitting side executes a DWR (Data Write Request) on a socket buffer, and at this time, data written to the buffer may be an FSP message. The PAC is first control information, and may be periodically generated to correspond to each ACC (a second control information). One PAC has no constraint on the number of FSP messages to be authenticated (0 to any number). Because it is Soft Realtime, the Interval of PAC may be changed. MAX_PAYLOAD_SIZE is the maximum size of the Payload field in the FSP message designated by the sender, and the sender may determine the appropriate payload size that may be transmitted within the ACC cycle by checking the pre-obtained networking performance indicator. In this case, the calculation of an appropriate size may take into account parameters such as the total amount of transmission/time or the average sliding window for the last predetermined time, or performance data that may be provided from a lower TCP stack, but the calculation is not limited thereto.

According to an example of the present invention, since both ACC and PAC are periodically generated, a data transmission start and an end time intervals may be mapped to 0 to a plurality of ACC cycles. Therefore, when there is no payload, one latest ACC that has already occurred based on the start time of payload transmission may be selected and one PAC is mapped, and in the case of one to many others, an ACC selection standard may be required. Specifically, ACC is periodically generated irrespective of the data generation time or not, and if the ACC generated at any time is ACC1, the ACC generated in the next cycle is ACC2, and then, when expressed in the manner of ACC3, t1 may be the generation and transmission start time of all data, and t2 may be the completion time of transmission of the data. ACC may be selected or generated at t1, and in the case of PAC generation, it may be generated at a time point such as before t1 or immediately after t2. For better understanding of the explanation, all t1 are regarded as the point at which the system may know all of the data and the point at which transmission starts at the same time. When the PAC is generated at the end of transmission, the transmission data integrity guarantee of the transmitting side may be enhanced.

t1 must always be the point in time when the current ACC is available (i.e., at least ACC1 must be determined on a reliable channel), t2 is a point in time after the latest available ACC at the time, and the number or contents of ACCs that occurred between t1 and t2 may not be known in advance. When an ACC occurs before t2, the sender may select whether to use these one or more ACCs. For example, in connection with the time relationship between the ACC occurrence time and the payload transmission/reception time t1 and t2, the payload transmission may be completed within one period such as ACC1<t1<t2<ACC2, depending on the size of the Timestamp value. Alternatively, additional ACC may occur between the start and end of payload transmission, such as ACC1<t1<ACC2< . . . <ACCn<t2<ACCn+1. At this time, the transmitting side may select whether to use only the first ACC1, and otherwise all of ACC2 to ACCn generated after the first ACC1.

In an example, when data is divided, that is, as the size of data that may be sent for each period is determined according to the situation, it is divided or segmented (or chunking) according to the data size, an FSP message may be generated for the divided data or the segmented data (Chunked Payload), and then the latest ACC may be selected at the time of transmission, a PAC may be generated by using the selected ACC, and then the PAC may be shared, a PAC using a new ACC in every cycle may be generated and then periodically may be shared on the reliable channel.

In terms of collaborative system, when the entire system is optionally assumed to be Soft Realtime, even if the same ACC is used repeatedly for a certain number of times (several times) due to the deviation of the PAC generation cycle even without generating ACC and PAC for every exact cycle, unless the number of repeated uses is large, any problem may not be caused from a security point of view.

Using this method, even if all FSP messages transmitted from the original sending communication node may be delivered through any communication node, since relay and forwarding may be possible, in the case for establishing not only transmission through 1:1 session, but also random relay or forwarding 1:N transmission session, transmission is possible regardless of the order in which FSP messages occur. Even in a topology in which 1:N transmission sessions are hierarchically connected, random transmission and propagation may be possible regardless of the order of FSP generation.

In another example, other methods for selecting ACC are as follows: 1) Payload is regarded as Stream, and after BWR occurs, a separate Watch Process monitors the Byte Count of Payload to determine the FSP generation input according to a specific rule, or 2) only one ACC may be applied respectively to all chunks where BWR occurs. But these methods are only example, the present invention should not be limited to these methods.

As described above, an original data authentication code including a nonce value generated by the first communication node 200, the second communication node 300, or the third communication node 400, and a sequence number required for the operation of an upper application may be periodically issued on a reliable channel (see RC in FIG. 2A), and a plurality of nodes receiving original data (including sequence number and nonce value generated by a sending node) through P2P networking on an unreliable channel (see URC in FIG. 2B) exchange information through a dual channel that verifies the original data through an authentication code periodically disclosed on the reliable channel. Therefore, the first communication nodes 200, 300, and 400 may maintain data reliability, and a communication may be realized by minimizing the limitation of processing speed, capacity, and timeliness of data, and external exposure of data and data exchange patterns. In particular, these communication methods may be operated on an enterprise block chain according to consensus based on an explicit node certificate or a public (not based on explicit certificate)

block chain. Preferably, these communication methods may be run on an enterprise block chain which is relatively advantageous in terms of system responsiveness by finality.

In an example, when running on the enterprise block chain, it is turned out that the consensus processing speed for data recording is relatively faster than that of the public block chain, and the result value may be rendered immediately to be deterministic (i.e., the client node has a reliable state for a value transmitted through a reliable channel, such as the first control information and the second control information). For this reason, it may be possible to immediately verify the second control information at the receiving side. In addition, when running on an enterprise block chain, the operating entity of the node is clearly revealed or specified and, accordingly, the data transmission target may be specified, and the operating entity of a specific node (e.g., client, block chain, or seed provider) may be identified because of this reason so that unreliable channel access information such as first or second control information shared by an identified specific operating subject may be trusted.

Figure 3A:
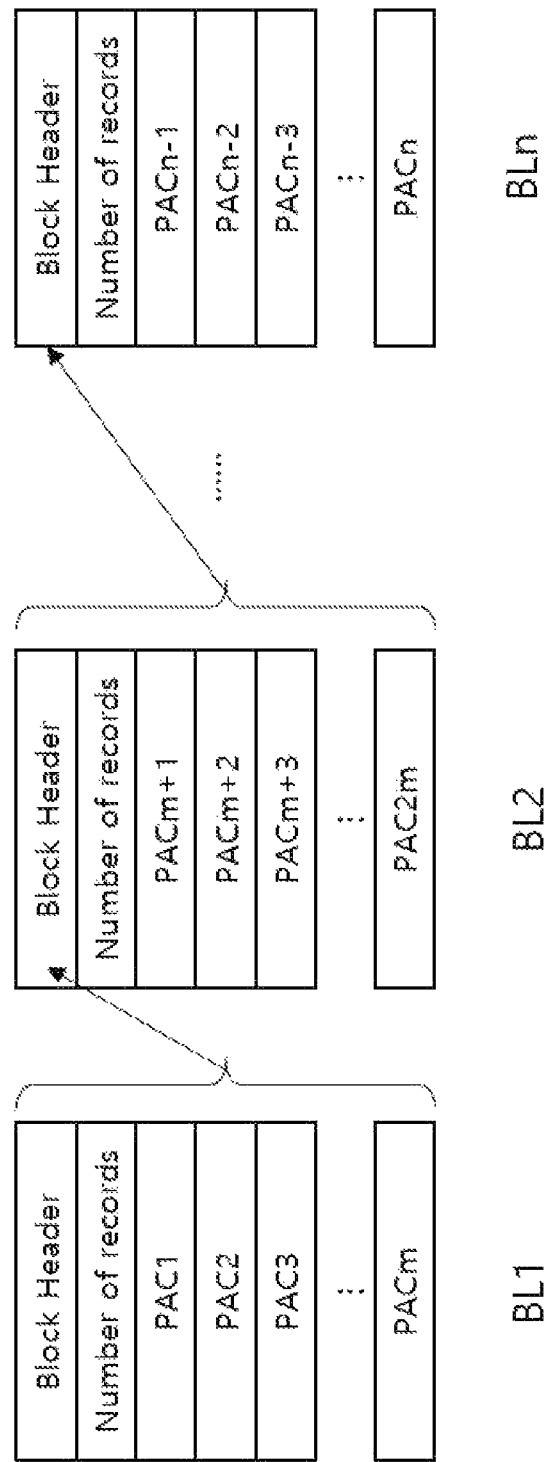
FIG. 3A and FIG. 3B illustrate that the first control information is recorded in a block and connected to a chain through a reliable channel according to an example of the present invention.
Figure 3B:
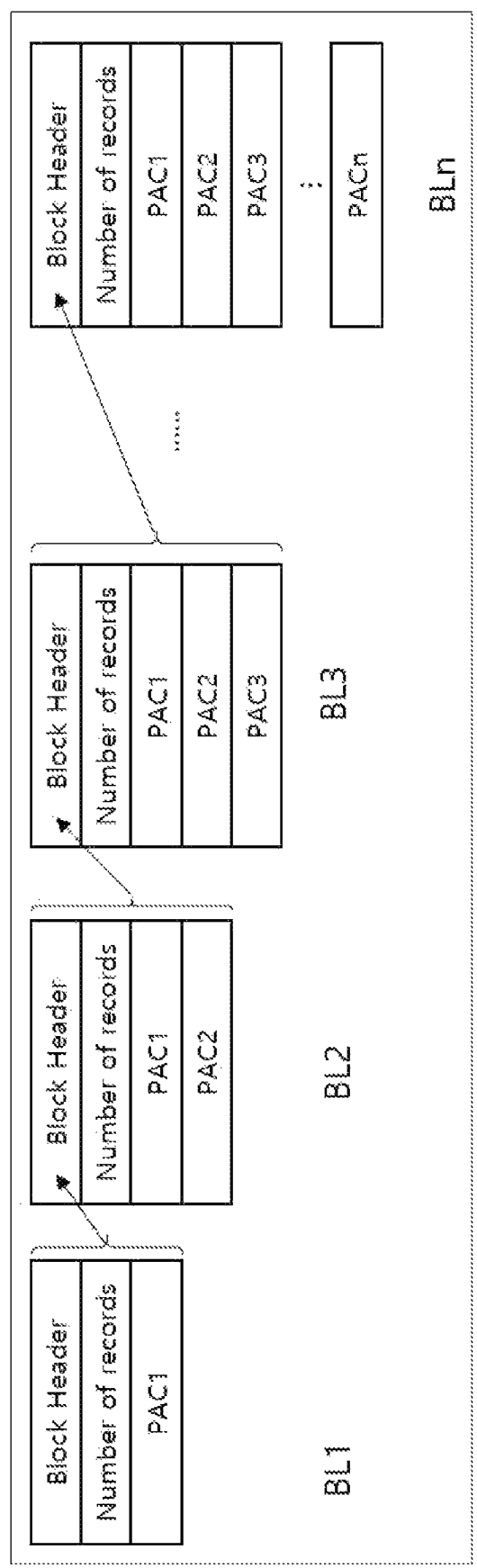
Figure 3C:
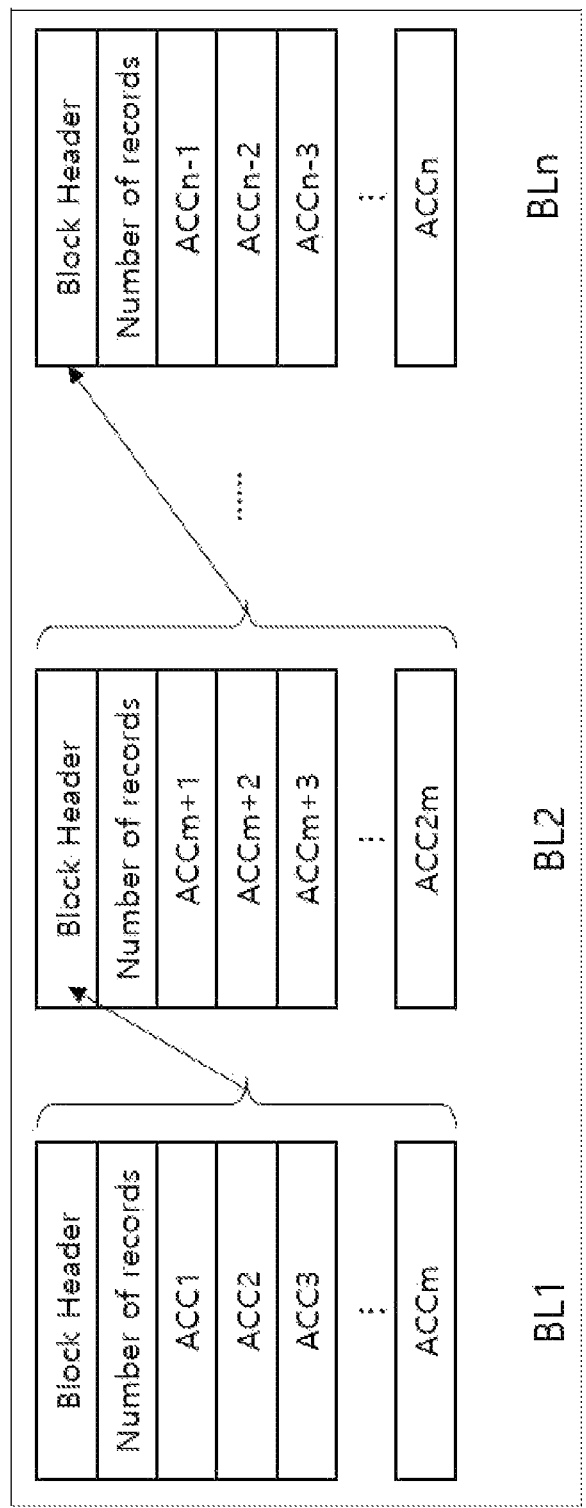
FIG. 3C and FIG. 3D illustrate that the second control information is recorded in a block and connected to a chain through a reliable channel according to an example of the present invention.
Figure 3D:
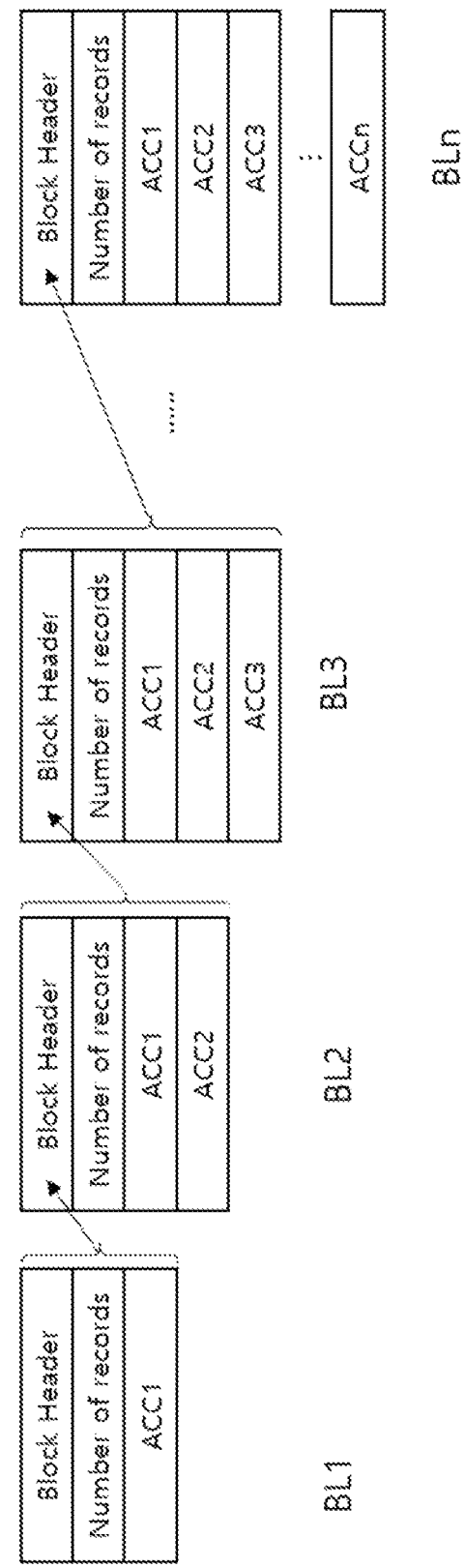

FIG. 3A and FIG. 3B illustrate that the first control information is recorded in a block and connected to a chain through a reliable channel according to an example of the present invention. FIG. 3C and FIG. 3D illustrate that the second control information is recorded in a block and connected to a chain through a reliable channel according to an example of the present invention. In an example, the first control information PAC may be transmitted in a certain pattern or periodically from the first block chain node 201 of the first communication node 200 to other participating block chain nodes 301 and 401 via a reliable channel. The first control information PAC may be recorded in the block according to a predefined consensus procedure between the block chain nodes, and may be shared among the block chain nodes. Similar to the first control information PAC, the second control information ACC may be transmitted in a certain pattern or periodically from the third block chain node 401 of the third communication node 400 to other participating block chain nodes 201, 301 through a reliable channel, and the second control information ACC may be recorded in the block according to a predefined agreement procedure between block chain nodes, and then may be shared between the block chain nodes.

In an example, one or a plurality of first or second control information may be recorded in one block, and may be connected through inter-block chains. In this case, the connection between blocks may be connected by a hash value of a hash function that inputs all or part of the previous block data.

In an example, the first control information PCC and the second control information ACC are transmitted and shared through a reliable channel and are recorded in a block, but may be allocated to independent channels, respectively. For example, the first control information PAC and the second control information ACC may be independently recorded in different ledgers. However, the present invention is not limited thereto, and the first control information PAC and the second control information ACC may also be recorded on one channel. The first control information PAC is at least one field value described in Table 1 to be described later, and at least one field value described in Table 1 to be described later may be recorded in a block. The second control information PAC is at least one field value described in Table 2 to be described later, and at least one field value described in Table 2 to be described later may be recorded in the block.

Referring to FIG. 3A, whenever the first control information PAC is generated by the first block chain node 201 of the first communication node 200 and is transmitted to the participating node, the first control information PCC may be recorded in the first block BL1, and when the first control information PCC is recorded in the first block BL1 by a predetermined number m of times (m is an integer), the first control information PAC generated at (m+1)th time may be recorded in the second block BL2. When the number m of first control informations PAC are recorded in the second block BL2 again, a next block BLn is generated, and subsequently, the first control information PAC may be recorded in the generated new block BLn. The block header of the blocks BL1, BL2, . . . , BLn, n is an integer greater than m) includes a hash value for the previous block, and may chain the blocks. The number of records of the blocks BL1, BL2, . . . , BLn means the total number of first control information PACs in the block.

Referring to FIG. 3B, each time when the first control information PAC is generated by the first block chain node 201 of the first communication node 200 and then is transmitted to the participating node, a new block may be generated and the first control information PAC may be recorded in the generated block. For example, one first control information PAC may be recorded in the first block BL1, two first control information PACs may be recorded in the second block BL2, and three first control information PACs may be recorded in the third block BL3. Furthermore, n pieces of first control information PAC may be recorded in n-th block BLn. Here, the number of generated blocks may be proportional to the number of generated first control information PACs, and may be chained through an inter-block hash value.

Referring to FIG. 3C, whenever the second control information ACC is generated by the third block chain node 401 of the third communication node 400 and then is transmitted to the participating node, the second control information ACC may be recorded in the first block BL1. When the second control informations ACC corresponding to a predetermined number (m pieces, m is an integer) are recorded in the first block BL1, the second control information ACC generated at (m+1)th time may be recorded in the second block BL2. When the m pieces of second control information ACC are recorded in the second block BL2 again, the next block BLn may be generated, and the second control information ACC may be recorded in the next generated block BLn. The block header of the blocks BL1, BL2, . . . , BLn may include a hash value for the previous block, and may chain the blocks. The number of records of the blocks BL1, BL2, . . . , BLn means the total number of second control information ACCs in the block.

Referring to FIG. 3D, each time when second control information ACC is generated by the third block chain node 401 of the third communication node 400 and then is transmitted to the participating node, a new block may be generated and the second control information ACC may be recorded in the generated new block. For example, one second control information ACC may be recorded in the first block BL1, two second control information ACC may be recorded in the second block BL2, three second control information ACC may be recorded in the third block BL3, and n pieces of second control information ACC may be recorded in the n-th block BLn. Here, the number of the generated blocks may be proportional to the number of generated first control information PACs, and may be chained through an interblock hash value.

Figure 4A:
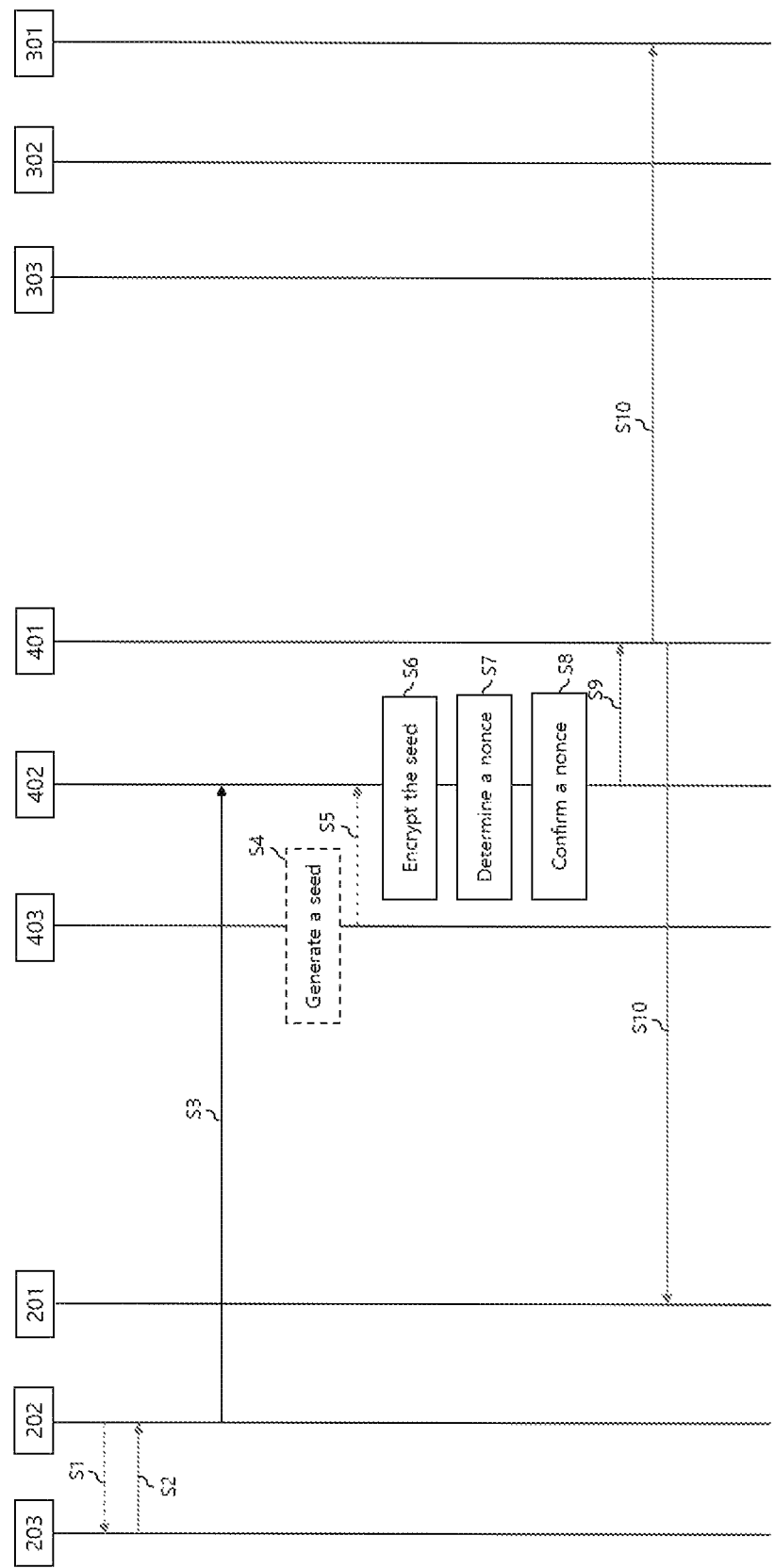
FIG. 4A and FIG. 4B are flowcharts for sharing second control information for increasing entropy of first control information according to an example of the present invention.
Figure 4B:
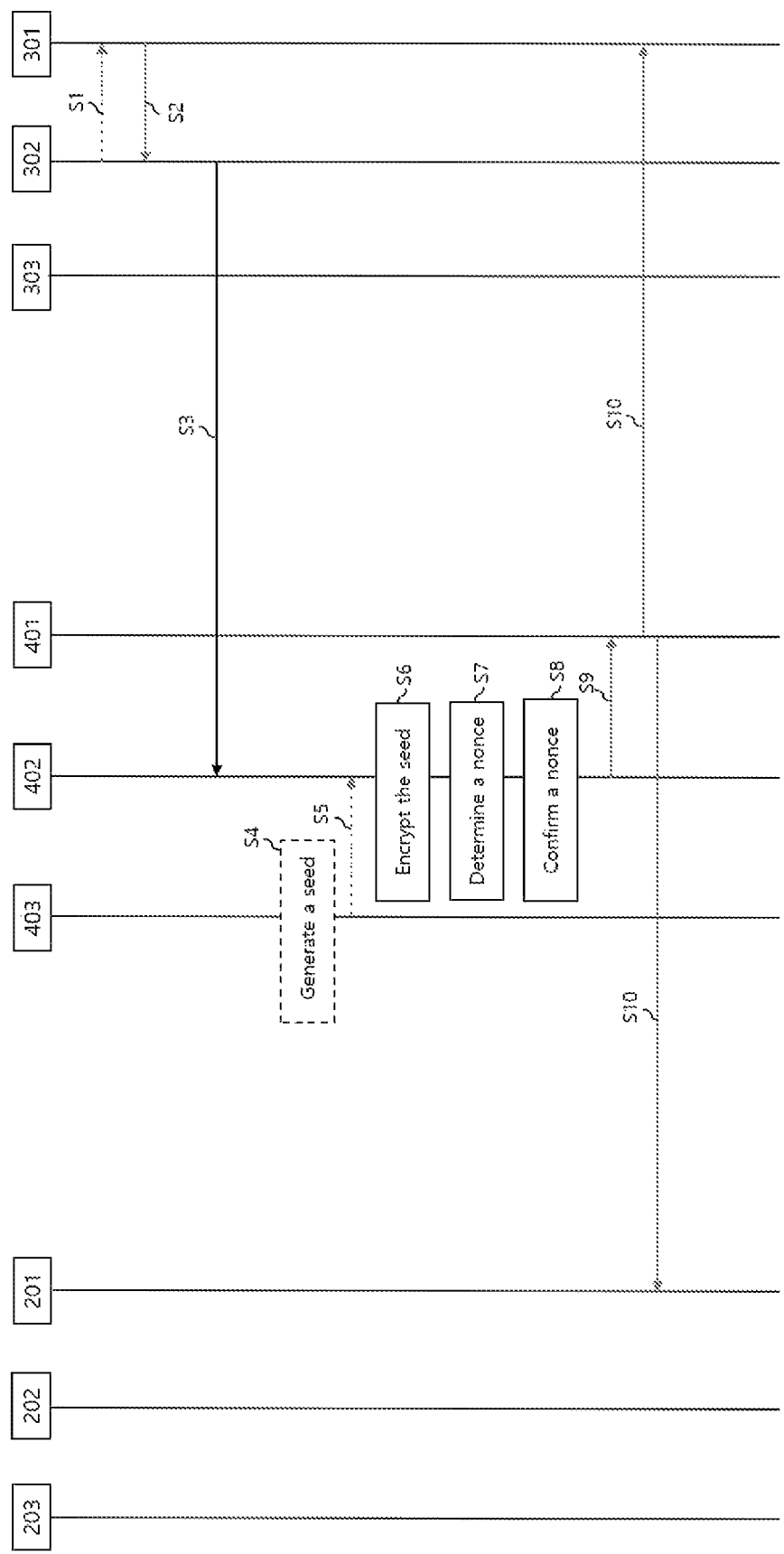

FIG. 4A and FIG. 4B are flowcharts for sharing second control information for increasing entropy of first control information according to an example of the present invention.

Referring to FIG. 4A, if needed, the first client node 202 of the first communication node 200 may transmit a seed request signal to a seed generation node 203 (S1), and the seed generation node 203 may transmit the seed information to the first client node 202 in response to the seed request signal (S2). In an example, the seed generation node 203 may periodically generate seed information regardless of a seed request and then transmit the seed information to the first client node 202 in order to minimize a return delay upon receiving a seed request. The seed generation node 203 may periodically generate seed information, maintain it for a predetermined valid period, and then be disregarded. The seed information may be a constant used as an initial value for a pseudo-random nonce generator, and a seed of a nonce initially designated may generate a following result, and the result may again serve as a seed value.

The first client node 202 may transmit the generated seed information to the third client node 402 of the third communication node 400 (S3). In an example, the seed information may be encrypted with the private key of the first communication node 200 and then be transmitted to the third client node 402 of the third communication node 400 so that a seed generating entity may be identified. That is, the first client node 202 may encrypts the seed information with the private key of the first communication node 200 to explicitly indicate that the first client node 202 itself is a seed generating entity. If necessary, when the public key of the first communication node 200 is not disclosed to other communication nodes, the public key of the first communication node 200 may be optionally transmitted to the third communication node 400 together with the encrypted seed information. In another example, the first block chain node 201 of the first communication node 200 instead of the first client node 202 may transmit the seed information generated by the seed generation node 203 to the third block chain node 401 of third communication node 400.

In another example, when there is no seed information provided by the first communication node 200 or the second communication node 300 to be described later, the seed generation node 402 itself of the third communication node 400 instead of the steps S1 to S3 may generate a seed information (S4) and may transmit the generated seed information to the third client node 402 (S5).

Thereafter, the third client node 402 may optionally encrypt the seed information transmitted from the first client node 202 or the seed information generated in the seed generation node 403 with the private key of the third communication node 200 (S6). By encrypting the seed information transmitted from the first client node 202 with the private key of the third communication node 200, the entropy of the nonce value determined based on the transmitted seed information described below may be increased.

Thereafter, the third client node 402 may determine a nonce value by using the seed information encrypted with the private key of the third communication node 200 (S7). For example, a nonce value may be generated by setting the seed information as an initial value of the nonce generator.

Thereafter, the third client node 402 may check whether the determined nonce value has been previously used (S8). Specifically, the third client node 402 may check whether a nonce determined through a chain code or a smart contract has been previously used. If the determined nonce value is a previously used nonce value, the third client node 402 may request new seed information to the first client node 202 that provides the seed information, or the node 403 itself may generate a seed information, and then determine again the nonce value.

In an example of the present invention, when the block chain network is based on Hyperledger Fabric, and at this time, a key-value database is used, the complexity for checking if a nonce value generated at a specific time has been previously issued may be 0 (1). In an example, the nonce determined through chain code or smart contract execution is decrypted with a public key, and therefore, it is possible to verify whether it is the same as the original or not, or to verify whether or not the current nonce has been previously issued by full scanning.

Thereafter, the third client node 402 may transfer the confirmed nonce value to the third block chain node 401 (S9). In FIG. 4A, the steps S6 to S8 of encrypting seed information and determining and confirming a nonce value may be also performed by the third block chain node 401. In this case, the step S9 may be omitted.

Thereafter, the third block chain node 401 may generate authentication carrier code information (hereinafter, referred to as second control information) by using the confirmed nonce value, and may transmit it to the first block chain node 201 of the first communication node 200, and the second block chain node 301 of the second communication node 300 (S10). In an example, the third block chain node 401 may transmit the second control information to the first block chain node 201, and after the first block chain node 201 stores the second control information and then transmit the second control information to the second block chain node 301. Optionally, the third block chain node 401 may transmit the second control information to the second block chain node 301, and after the second block chain node 301 stores the second control information and then the second block chain node 301 may transmit the second control information to the first block chain node 201. The second control information is shown in Table 1 below.

TABLE 1

| FIELD | EXPLANATION |
| --- | --- |
| Signed Seed (optional item) | If a seed generation node provides seed information, a value obtained by encrypting a corresponding seed value with the private key of the seed generation node. The value of field is used for authentication of the seed providing entity, and is not used as seed information for generating a nonce in the second control information. |
| Seeder (optional item) | A public key of the node that provided the seed information to generate the second control information |
| Service Provider (optional item) | Service provider's public key If the service provider's public key is identifiable on a reliable channel, an explicit second control information is shared, otherwise, it is an implicit second control information. |
| Value (required item) | A nonce value generated based on the seed information provided by the seed generation node or generated by using the seed information value generated by the service provider itself. |
| Signed Value (optional item) | The result of encrypting the Value with the private key by the service provider |
| Timestamp (required item) | Absolute value of time at which the second control information was generated |

Among the second control information, values of the Signed Seed, Seeder, and Service Provider fields and the Signed Value are optional information. If the value of the Seeder field is a null, the second control information may have been generated by the service provider, and the Signed Value may be used to authenticate an entity sharing the Value. For example, the entity sharing the Value may be authenticated by decrypting the Signed Value by using the value of the Seeder or Service Provider field and then checking whether or not the Value is derived.

As the authentication carrier code, which is the second control information, the third communication node of the service provider repeatedly generates a highly reliable nonce value and share the nonce value on the block chain channel, which is a reliable channel. This nonce value is similar to a challenge value sent from the server to the user at a time when the user wants to authenticate himself in the challenge-response of the conventional authentication procedure, and may have a nonce characteristic (one-time use recommended). However, unlike the conventional authentication protocol, the third communication node of the service provider of the present invention, which presents the challenge value may have a role and responsibility for maintaining the characteristics of random numbers for shared nonces and for managing whether the second control information is not repeatedly used. Furthermore, as the second control information is shared in the reliable channel, a role to supervise whether the service provider's actions are properly performed may be assigned to the network participants (e.g., the first communication node and the second communication node which are the allowed nodes of the block chain network). In addition, when the second control information is periodically shared on a reliable channel, the network participants (all entities of the first communication node~the third communication node) may be used as the following two forms after acquiring use the latest second control information.

First of all, the second control information may be used as a challenge value for authentication and may be used to generate an authentication evidence value. Secondly, when an additional random number value is required when transmitting specific data, the second control information may be used as a value signed. Specifically, by signing or encrypting the second control information with its own private key, a specific node may simultaneously present its own authentication evidence value to a plurality of specific receiving side nodes which know its public key. This has an advantage in securing 1:N communication efficiency. At this time, by allowing the evidence value to be included in a periodic message authentication code (hereinafter referred to as second control information) to be described later, even when a number of receiving nodes receive a message (e.g. Forwarding-safe Payload) to be described later as the form of a store-forward after relay or storage through a relay communication node other than the original transmission node. Also, there is an effect of authenticating the communication node that generated the original message (FSP). In other words, there is an advantage in securing visibility of the integrity of the original data. In addition, although it is a direct data exchange, authentication of the original communication node is possible even when a relay node is introduced, a wide and various types of information may be transmitted and reliability of the information at this time may be guaranteed.

In addition, the second control information may be used as a nonce value for securing entropy when generating a 1:N message authentication code on multiple channels. Specifically, the transmitting side communication node may have the effect of replacing a random number value that needs to be included when constructing a message (FSP). In order for the transmitting communication node to authenticate itself, there is a Signed Nonce included in the first control information, and the nonce may be generated in the following two ways. The signed nonce of the first control information may be shared through the first control information, and the nonce of an initial value for calculating this may be included in a message (FSP) and transmitted to a receiving communication node.

First of all, the first nonce value obtained from the second control information ACC or the nonce value generated by the seed generation node 203 of the transmitting communication node may be signed or encrypted with the private key of the transmitting communication node. Then, Signed Nonce of control information may be determined. Secondly, the Signed Nonce of the first control information may be determined by signing and encrypting the independent nonce value directly generated by the sender.

In the case of the Signed Nonce of the first control information generated by signing or encrypting the nonce obtained from the second control information with the private key of the sending communication node, the result of signing or encrypting with the sender private key may maintain sufficient random number characteristics by itself. Therefore, the result value may not be predicted because it is impossible to derive the private key, and since the result value itself is also an encrypted result, the entropy is expected to be sufficiently high. Therefore, it is preferable to use the nonce value obtained from the second control information as a basic nonce value for including as a signed nonce of the first control information. The signed nonce may be determined as a result of signing or encrypting the initial nonce value with the sender's private key, and then, may be recorded in the first control information. Furthermore, the initial nonce value may be recorded in the message(FSP) in a signed or unencrypted state. This is a method in which a random number value of sufficient stability may be easily obtained while reducing the burden of the transmitting side communication node for generating a random number separately.

In addition, this is a method of embedding an authentication evidence value of a transmission subject in each of the first control information and the message(FSP) for each of the first control information and the message(FSP) transmitted through different channels. On the other hand, as for a method in which the transmitting side communication node independently generates a random number value, an evidence value for authenticating a transmitting subject of a message(FSP) is separately transmitted through first control information. When the sending subject authentication evidence value is embedded in each of the first control information and the message(FSP), state management between the first control information and the message(FSP) is unnecessary. Implementation may be convenient when the receiving communication node verifies each of the first control information and the message(FSP). All of these characteristics are secure under the assumption that the second control information always maintains the random number characteristics, and the responsibility in this case may be imposed on the communication node of the service provider.

Since all the entities participating in the network are capable of generating a random number, the Signed Nonce of the first control information may be optionally determined by using an independent random number value directly generated by the sender. In the transmitting side communication node, the second control information provided by the communication node of the service provider is limited only for authentication purposes, and the nonce for message verification may be generated/used by the transmitting and receiving communication node by itself. In this case, since the evidence value for authenticating the message(FSP) transmission subject must be separately transmitted to the communication node of the receiving side through the first control information, it is necessary to maintain state management of the first control information necessary for verification.

FIG. 4A illustrates an example in which second control information is generated by using a nonce value provided by the first communication node 200 on the transmitting side, but in another example, as shown in FIG. 4B, the second control information may be generated by using a nonce value provided by the second communication node 300 on the receiving side. The description of the steps S1 to S10 of FIG. 4B may refer to the description of the steps S1 to S10 of FIG. 4A unless there are no contradictions.

Figure 5:
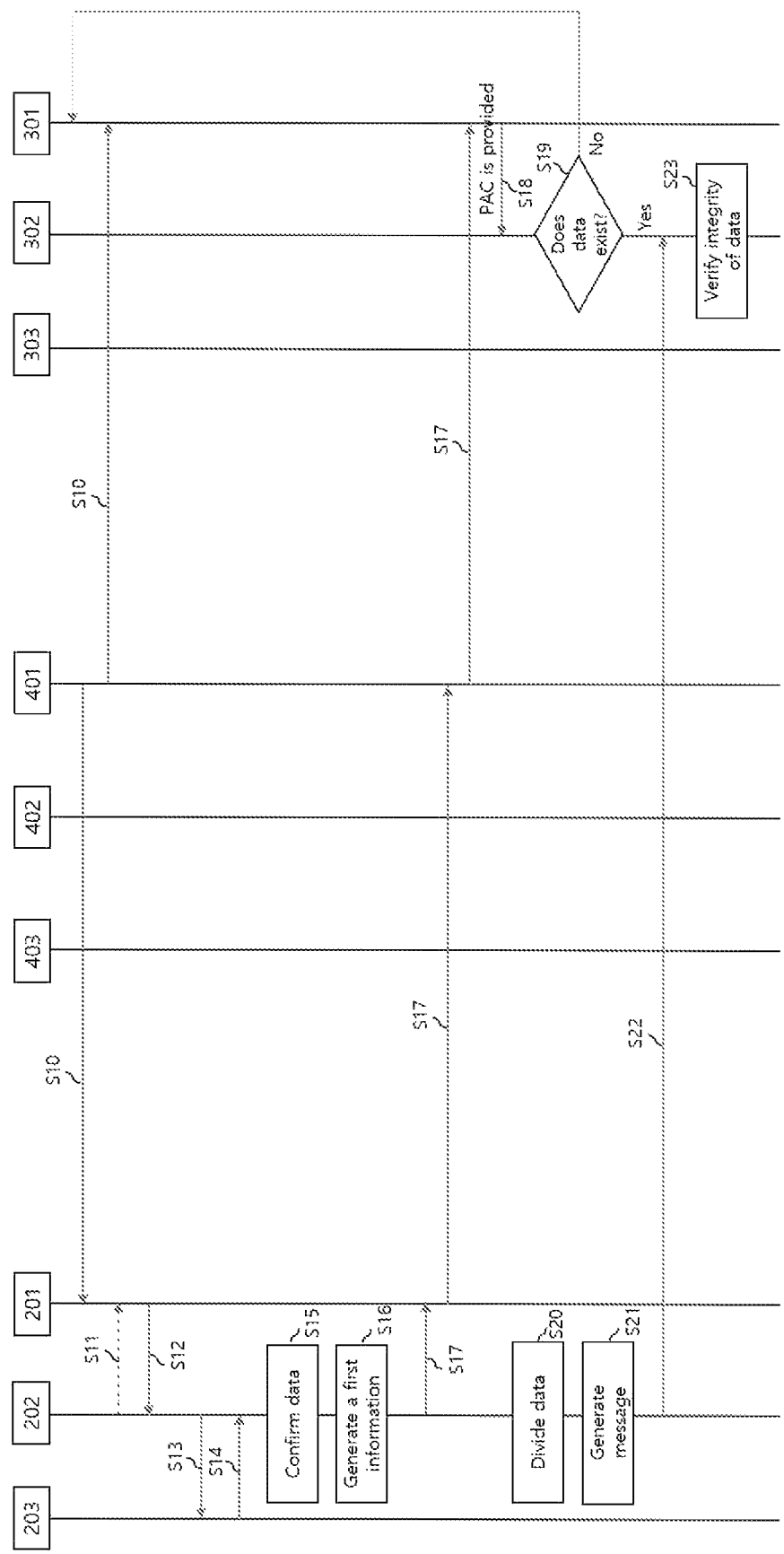
FIG. 5 is a flowchart of data processing according to an example of the present invention.

FIG. 5 is a flowchart of data processing for a collaboration service according to an example of the present invention.

Referring to FIG. 5, the third communication node 300 of the service provider may periodically transmit the second control information generated by the above-described procedure of FIG. 4A or 4B through the third block chain node 401 to the first communication node, and the second block chain node 301 of the second communication node 300 (S10). In an example, when the third block chain node 401 transmits the second control information to the first block chain node 201, the first block chain node 201 may store the second control information and then, may deliver the second control information to the second block chain node 301. Optionally, if the third block chain node 401 transmits the second control information to the second block chain node 301, the second block chain node 301 may store the second control information, and then, may transmit the second control information to the block chain node 201.

Next, the first client node 202 of the first communication node 200 may request the second control information to the first block chain node 201 (S11) and may receive the second control information from the first block chain node 201 (S12). In some examples, the first client node 202 may periodically receive the second control information from the first block chain node 201 without a request for the second control information of the first block chain node 201 (S12).

Next, the first client node 202 of the first communication node 200 may requests a nonce value to the first seed generation node 203 (S13), and receive the nonce value from the first seed generation node 203 (S14). In an implementation, steps S11 and S12 and steps S13 and S14 may be performed in parallel.

The nonce value generated in steps S13 and S14 is a value to always allow the first control information of different values to be shared, regardless of whether there is data to be transmitted from the first communication node 200 to the second communication node 300 when periodically transmitting the first control information PAC to be described later. This is to allow the first control information to have different values always to be shared. If the first control information PAC is configured using only the nonce value obtained from the above-described second control information ACC, the same first control information PAC is generated for the same transmission data due to the characteristic of the hash function used when configuring the second control information. Thus, the nonce value generated in steps S13 and S14 may be used to generate the first control information.

Next, the first client node 202 may check whether there is data to be transmitted to the second communication node (S15), and may generate first control information according to whether data is transmitted (S16). In order to share the generated first control information through a block chain network, when the first client node 202 transmits the generated first control information to the first block chain node 201, the first block chain node 201 may share the first control information with the participating nodes including the second block chain node 301 and the third block chain node 401 through the block chain network (S17). For example, if the first block chain node 201 transmits the first control information to the third block chain node 401, the third block chain node 401 stores the first control information and then, may transmit it to the node 301 (S17). Alternatively, when the first block chain node 201 transmits the first control information to the second block chain node 301, the second block chain node 301 stores the first control information and then, may transmit it to the third block chain node 401 (not shown).

The first control information is shown in Table 2 below.

TABLE 2

| FIELD | EXPLANATION |
|---|---|
| Sender | As a public key of the sending communication node, it is registered on the reliable channel |
| Signed Nonce | A value obtained when the nonce to be delivered through the FSP message to be described later is signed or encrypted with the sender's private key. |
| Timestamp | Time value recorded by the sending communication node. It is same as Timestamp of FSP message. (The receiving node may obtain the first connected control information having the same timestamp as this field value by referring to the Timestamp in the FSP message) |
| Value | Value = H(Payload in FSP, Nonce in FSP, Nonce in ACC) Payload in FSP: Payload(data or divided data) of the FSP message Nonce in FSP: Nonce value of FSP message Nonce in ACC: Nonce value of the second control information ACC |

When the receiving communication node receives the nonce through the FSP message, the nonce value of the Signed nonce is the nonce value obtained from the second control information, and when there is no data to be transmitted from the transmitting communication node, that is, if there is no data transmission, the nonce value of the signed nonce may be a nonce generated by the sender. In an example, when the transmitting communication node does not transmit data, since data verification is unnecessary at the receiving side, the Signed Nonce field may be set to null or omitted.

The timestamp of the first control information is an absolute time value indicating the generation and transmission time of the first control information, and may be the same as the timestamp of the FSP message. The value of the first control information is an output value of a hash function which designates the data or a segment of the data (Payload in FSP), a nonce value (Nonce in FSP) included in an FSP message to be described later, and a nonce value (Nonce in ACC) of the second control information. This is the output value of the hash function as an input value.

In an example, when there is no data to be transmitted to the second communication node, Payload in FSP may be set to null. Accordingly, the first control information may be generated irrespective of whether data is transmitted or not, and may be periodically transmitted to participating nodes including the second and third communication nodes. Even when there is no data to be transmitted, as the first communication node 200 of the transmitting side may periodically generate first control information and share it with participating nodes through a reliable channel, the participants of the block chain network may have some difficulties in confirming a data exchange pattern of the sending side.

Thereafter, if there is data to be transmitted to the second communication node, the first client node 202 may check whether the size of the data to be transmitted is greater than the threshold value, and may divide or segment the data to be transmitted when the size of the data to be transmitted is greater than the threshold(S20), and a message(having an FSP protocol format) may be formed and transmitted for each of a plurality of divided or segmented sub-data(S21, S22). On the other hand, when the size of data to be transmitted is equal to or smaller than the threshold value, data division or segmentation may not be performed. Division or segmentation of data may be determined as a size M in consideration of an average transmission amount within a period. For example, FSP messages of ceil(N/M)=F may be generated. Here, N is the size of the data and M is the average transmission amount.

The format of the FSP protocol of the message is shown in Table 3 below.

TABLE 3

| FIELD | EXPLANATION |
|---|---|
| Sender | A public key of the sending node registered/shared on the reliable channel |
| PAC Timestamp | A time when the FSP was created. Search connected PAC using the timestamp value |
| ACC Timestamp | ACC timestamp used by the sending node to generate the PAC. If the Signed ACC Value is not null in the ACC whose timestamp is selected as the key value, the Signed ACC Value was used. In this case, the receiving side decrypts the Signed ACC Value with the Service Provider public key, compares it with the ACC Value value and verifies it, and if there is no problem, performs a verification process by using the ACC Value. |
| Service Provider Enabled | 0: ACC generated by another subject in the network is used. 1: ACC shared by Service Provider is used. |
| Sequence Start Number | After performing Chunking for the highest application transmission request payload given at this time, designate the last transmitted sequence number as +1 |
| Sequence End Number | After performing Chunking for the highest application transmission request payload given at this time, designate Sequence Number as +F according to ceil(N/M) = F results |
| Sequence Number | The order of this FSP among FSPs of F count. |
| Nonce | Since the transmitting side includes a random number value when transmitting data, the status value of the transmitting side is continuously changed regardless of the presence or absence of data to be transmitted. The receiving side performs MAC verification of the data containing the random value, and the transmitting side assigns this value differently to each sequence number or one application transmission request. |
| Payload | It is a format defined by the application, and the expression method when delivered is irrelevant to protocol buffer, REST, JSON RPC, self-defined wired protocol, etc. Therefore, the lower session may be related to RFC standards. It may be determined in the lower protocol session layer whether to apply symmetric key encryption for payload. In implementation, Payload may be encrypted. When the payload is encrypted, relaying between multiple nodes and a key exchange procedure with the provider of the original data when forwarding occurs is performed. |

On the other hand, the second block chain node 301 of the second communication node 300 may receive the first control information (S17) from the third block chain node 401 of the third communication node 400 or the first block chain node 201 of the first communication node 300, and may transmit it to the second client node 302 (S18). The second client node 302 determines whether there is data to be transmitted from the first client node 202 (S19), and if there is no data to be transmitted, the second client node 302 moves to step S10 and may receive the second control information and the first control information. If there is a data to be transmitted, the process proceeds to step S23 to receive a message for each of the plurality of sub-data from the first client node 202 or the third client node 402, and the integrity of the data may be verified by comparing the received messages and first control by comparing the information. Specifically, data integrity may be verified by comparing a value calculated from a message in the FSP format, and a value of the first control information. The value calculated from the FSP format message may be calculated by inputting the payload of the FSP format message, the nonce of the FSP format message, and the nonce value of the second control information into the hash function.

Figure 6:
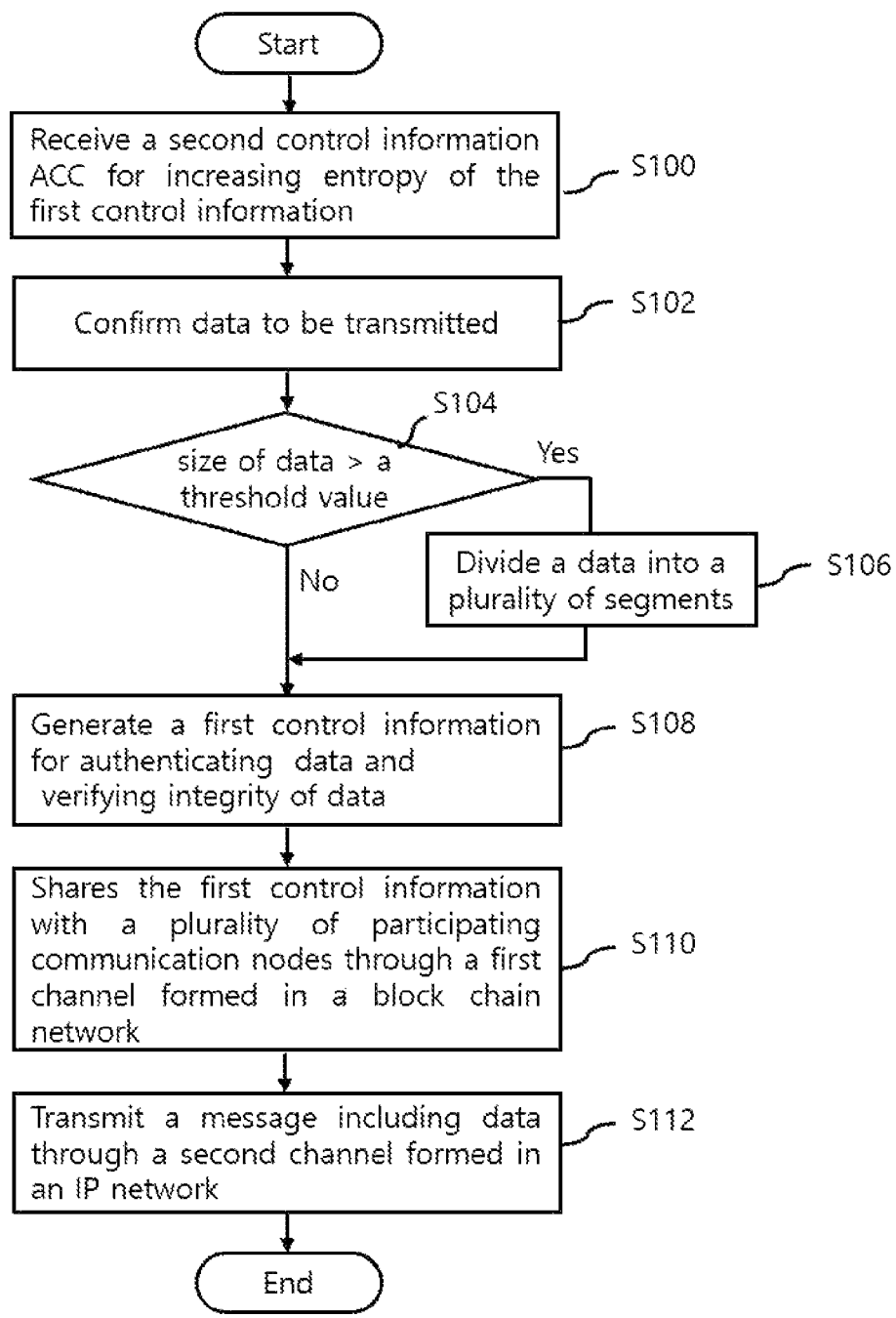
FIG. 6 is a flowchart illustrating a method of operating the first communication node according to an example of the present invention.

FIG. 6 is a flowchart illustrating an operating method of the first communication node 200 according to an example of the present invention. The first communication node 200 may be a main node which transmits data to the second communication node 300.

Referring to FIG. 6, the first communication node 200 may periodically receive the second control information ACC of Table 1 from the third communication node of the service provider through a reliable channel in step S100. At this time, the second communication node 300 may also periodically receive the second control information ACC of Table 1 from the third communication node of the service provider through the reliable channel, so that the second control information may be shared among participating nodes in the block chain network.

Thereafter, the first communication node 200 may check data to be transmitted to the second communication node in step S102. The data to be transmitted may be data generated at an application level. Step S100 and step S102 may be performed in parallel. In another example, step S100 may be performed after step S102.

After confirming the data to be transmitted to the second communication node, if it is greater than the data size threshold to be transmitted in step S104, a process may proceed to step S106, and the data may be divided into a plurality of sub-data(or segments). Here, the number of segments may be determined in consideration of an average transmission amount within a period. On the other hand, if the data size to be transmitted is equal to or smaller than the threshold value, since there is no need to divide or segment the data, the process proceeds to step S108.

Thereafter, the first communication node 200 may generate the first control information PAC shown in Table 2 for verifying data authentication and integrity in step S108. For example, in connection with the first control information PAC, the nonce value of the second control information ACC, a hash value outputted by the hash function having the payload of the FSP determined in step S106 and the nonce value in the FSP as input values, and the timestamp indicating the transmission time point of the first control information (which may be the same as the timestamp indicating the transmission time point of the FSP message), the public key of the first communication node 200, and the nonce value in the FSP message of Table 3 may be determined by the value signed with the private key of the first communication node 200. When there is no data to be transmitted, the payload of the FSP of the hash function may be set to a null value.

Thereafter, the first communication node 200 may share the first control information with at least one or more participating communication nodes including the second communication node 300 through a first channel formed in the block chain network at step S110. For example, the first communication node 200 may transmit the first control information to the third communication node 400, and after the third communication node 400 stores the first control information, it may be delivered to the second communication node 300. Alternatively, the first communication node 200 may transmit the first control information to the second communication node 300, and the second communication node 300 stores the first control information to deliver it to the third communication node 300.

Thereafter, the first communication node 200 may transmit a message including the data to the second communication node 300 through an unreliable channel in step S112. The message may include at least any one of a public key of the first communication node, a first timestamp value indicating a generation time of the data or a segment of the data, and a second timestamp value indicating a generation time of the second control information, a value indicating whether it is the second control information provided by a service provider, a sequence starting number value for transmission of the segment of data, a sequence ending number value for transmission of the segment of data, a sequence number of the segment of data, a nonce value for transmission of the data or segment of data, and the data or segments of the data.

In an example, in connection with the step for sharing the second control information ACC, the first communication node 200 may include the step for receiving the second control information from a third communication node of a service provider among the participating communication nodes. Alternatively, in connection with the step for sharing the second control information ACC, the first communication node 200 itself may generate the second control information and transmit the second control information to the participating communication nodes, so that the second control information may be shared with the participating communication nodes.

The second control information may include at least any one of a seed value encrypted with a private key of a seed provider; the public key of any one of the participating communication nodes (for example; the first communication node or the second communication node) that provided the seed value; a second nonce value generated by using the seed value; and the second timestamp values for transmission of control information. Optionally, the second control information may further include the second nonce value encrypted with a public key of the service provider and a private key of the service provider.

In an example, regardless of whether the data is transmitted or not, as the first control information is periodically transmitted to at least one or more participating communication nodes including the second communication node through a reliable channel, the participating nodes in the block chain network 1 may not know data exchange pattern of the communication node 200. Specifically, if a direct communication is performed, but the evidence value is shared in the reliable channel of the block chain network, the pattern of sharing the evidence value itself may become part of the data exchange pattern. However, if the first control information is shared periodically or at a specific pattern transmission period, both the transmitting/receiving node actually observing data exchange via a reliable channel, and the node of the service provider may not be distinguished. Thus, it becomes difficult understand the data exchange pattern.

Figure 7:
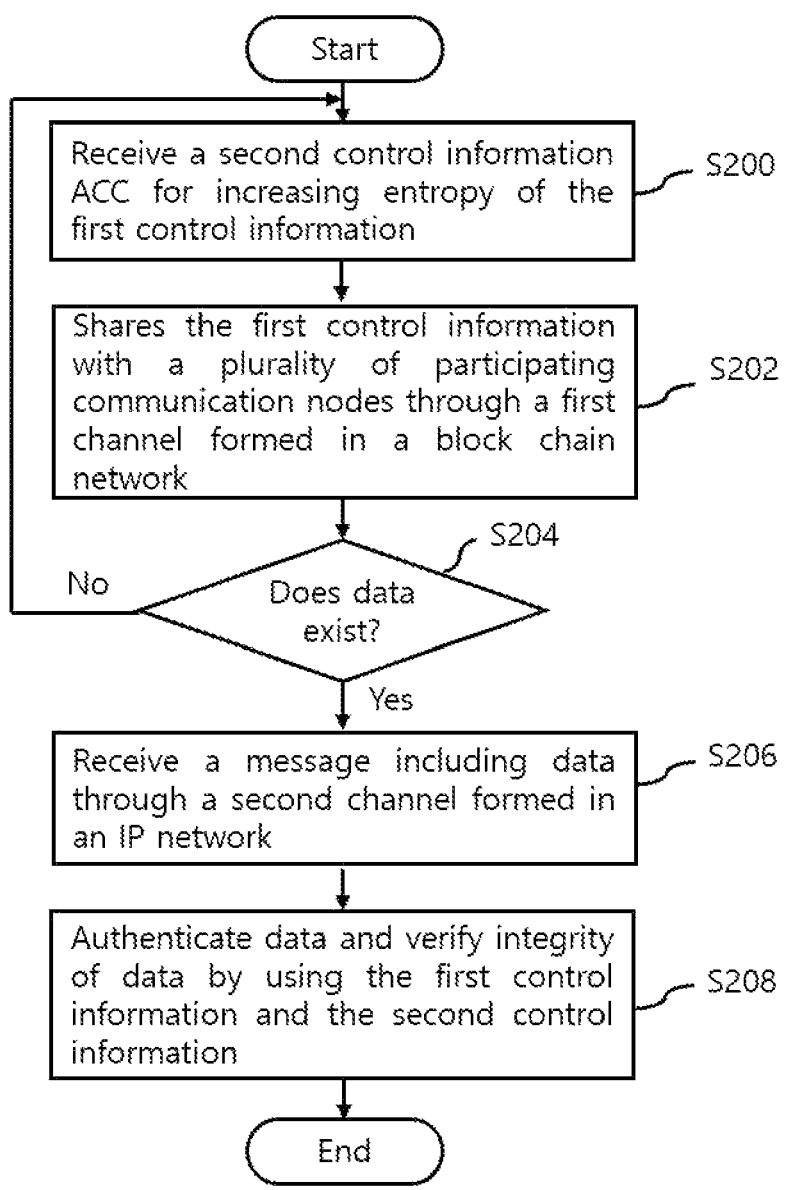
FIG. 7 is a flowchart illustrating a method of operating a second communication node according to an example of the present invention.

FIG. 7 is a flowchart illustrating a method of operating a second communication node according to an example of the present invention. The second communication node 300 may be a subject that receives data from the first communication node 300.

Referring to FIG. 7, the second communication node 300 may periodically receive the second control information ACC of Table 1 from the third communication node 400 of the service provider through a reliable channel in step S200. At this time, as the first communication node 200 also periodically receives the aforementioned second control information ACC from the third communication node 400 of the service provider through a reliable channel formed in the block chain network, the second control information may be shared among participating nodes in the chain network.

Thereafter, the second communication node 300 may share the first control information for verifying data authentication and integrity with at least one participating communication node including the first communication node 200 through a reliable channel. The second communication node 300 may receive and store the first control information from the first communication node 200 and then transmit it to the third communication node 400. Alternatively, after the third communication node 300 receives and stores the first control information received from the first communication node 200, the first control information may be transmitted to the second communication node 300.

Thereafter, the second communication node 300 checks whether there is data to be transmitted by the first communication node 200 in step S204, and then proceeds to step S200 when there is no data to be transmitted by the first communication node 200. Subsequently, the node 300 may periodically receive the first control information and the second control information from the corresponding communication nodes 200 and 400.

On the other hand, when there is data to be transmitted by the first communication node 200, the process proceeds to step S206, and the second communication node 300 may receive a message including the data from any one of the communication node 200, 400 among the at least one or more participating communication node through an unreliable channel. Preferably, the second communication node 300 may directly receive a message including the data through P2P communication with the first communication node 200.

Thereafter, the second communication node 300 may verify the integrity of the data by using the messages received in step S208 and the first control information and the second control information. Specifically, data integrity may be verified by comparing a value (value in Table 3) calculated from a message in the FSP format and a value of the first control information. The value calculated from the FSP format message may be calculated by inputting the payload of the FSP format message, the nonce of the FSP format message, and the nonce value of the second control information into the hash function.

Figure 8:
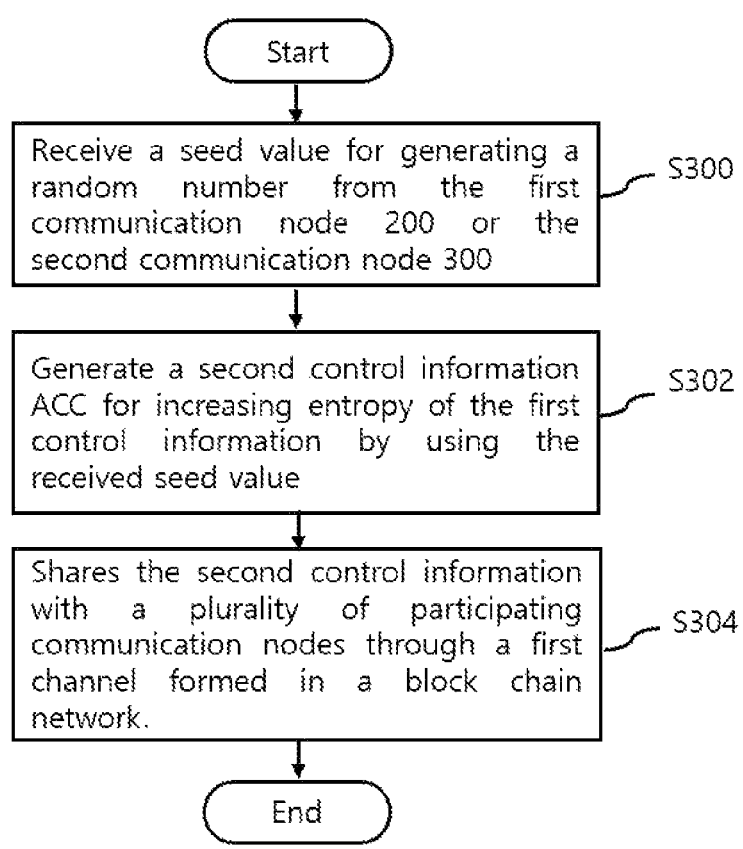
FIG. 8 is a flowchart illustrating a method of operating a third communication node according to an example of the present invention.

FIG. 8 is a flowchart illustrating an operating method of a third communication node according to an example of the present invention. The third communication node 400 may be a service provider.

Referring to FIG. 8, the third communication node 400 may receive a seed value for generating a random number from the first communication node 200 or the second communication node 300 in step S300, and may generate the second control information ACC for verifying data authentication and integrity by using the received seed value in step S302. Thereafter, the third communication node 400 may share the second control information with a plurality of participating communication nodes including the first communication node 200 and the second communication node 300 through a reliable channel in step S304. For example, the third communication node 400 may transmit second control information to the first communication node 200 or the second communication node 300 through the reliable channel, respectively. Alternatively, when the third communication node 400 transmits the second control information to the first communication node 200, the first communication node 200 may store the second control information and then, transfer the second control information to the second communication node 300. Alternatively, when the third communication node 400 transmits the second control information to the second communication node 200, the second communication node 300 may store the second control information and then, transmit the second control information to the first communication node 200. In another example, instead of a step for receiving a seed value for generating a nonce from the first communication node 200 or the second communication node 300, the third communication node 400 itself may generate a seed value for generating a nonce, and may generate by using the seed value.

In an example, the third communication node 400 which is a service provider, may share second control information specifying that the provided is an issuing subject or non-explicit second control information not specifying an issuing subject on a reliable channel at regular intervals. When the service provider shares the second control information, the initial value such as seed information may be generated after being generated and signed (e.g., the creation subject hashed the concerned value and presented the value encrypted with the private key, or only the concerned value encrypted with the private key may be presented) by the nodes (the first communication node 200 or the second communication note 300) of the subjects other than themselves to enhance the randomness of the second control information. Based on this state, second control information may be generated. Alternatively, after the service provider may determine the seed value by his own decision, the provider may use it to generate the second control information.

In addition, the second control information, or the update rule of a seed value for generating the second control information during periodic update may be determined by an issuing subject of the second control information, and the values which may not be predicted by the external subject continue to occur, but the initial second control information may be shared. Subsequently, since the second control information is continuously recorded in the block chain data structure, the explicit second control information at a specific point in time may confirm the first issuing subject, and subsequently, it is possible to check whether unnecessary changes have occurred. The second control information which does not specify the issuing subject may be used after confirming integrity of the data in the block (optional step) after the initial block is created.

At this time, if the first issuing subject (e.g., service provider) is described explicitly, the issuing subject's public key may become a key value or channel identifier, and the updated second control information is designated as the value for the corresponding key value. Therefore, it may be recorded on a key-value store that records a block chain or a block chain data. Each time when it is created as a block, one or more key-value pairs may be stored in a block, and each block may be linked with a hash value in consideration of a context of according to a block chain manner. In the case of non-explicit second control information, a new public key which is randomly generated may be used as a key instead of using the public key of the code issuing subject as the Key value. At this time, the code issuing subject must store a private key for the new public key generated earlier for preparing a case that it is necessary to certify that it is the issuing subject of non-explicit second control information in a specific step in the future. Through this process, the complexity for acquiring it in order to utilize the second control information may be maintained at O(1), and the valid codes that may be used during verification may be the final codes in the key-value store that may be checked by the verification side, and a certain number preceding them.

Part or all of the device (or module) or method (e.g., step) according to the present invention may be implemented by a set of instructions to be stored, a hardware, or a combination thereof which may be stored in a computer-readable storage media (e.g., a storage unit of a node) as a form of a program module. The instruction may be executed by hardware including one or more processors such as a microchip, and the one or more processors may perform a function corresponding to the instruction.

It will be apparent to those having a common knowledge in the related art that the present invention described above is not limited to the above-described examples and the accompanying drawings, and that various substitutions, modifications, and changes are possible within the scope of the technological spirit of the present invention.

EXPLANATION OF SYMBOLS IN THE DRAWINGS

10: collaborative system
CA: Certification Center
100: Network
150: block chain network
200, 300, 400: Communication node,
201, 301, 401: block chain nodes
202, 302, 402: Client node,
203, 303, 403: Seed generation node
RC: reliable channel
URC: Unreliable channel

What is claimed is:

1. A method of transmitting a data between communication nodes comprising:
confirming whether or not there is a data to be transmitted to a receiving side communication node by a transmitting side communication node among communication nodes connected to each other on the network;
generating first control information for verifying authentication and integrity of the data;
sharing the first control information with at least one or more participating communication nodes including the receiving side communication node through a channel formed in a block chain network; and
transmitting a message including the data through a channel formed in a network different from the block chain network,
wherein the first control information includes;
a public key of the transmitting side communication node;
a first nonce value encrypted with a private key of the transmitting side communication node;
a first timestamp value for the first control information; and an output value of a hash function having the data or segment of the data, the first nonce value, and a second nonce value included in a second control information for increasing entropy of the first control information as an input value.

2. The data transmission method of communication nodes of the claim 1, wherein if there is no data to be transmitted, the first nonce is set to a nonce value or a null value generated by the transmitting communication node itself, and the data of the hash function or the segment of data is set to a null value.

3. The data transmission method of communication nodes of the claim 1, wherein the receiving side communication node further includes a step for performing authentication on the transmitting side communication node which has transmitted the first control information by using the first control information and the message.

4. The data transmission method of communication nodes of the claim 1, wherein the receiving side communication node further includes a step for performing authentication on the transmitting side communication node which has transmitted the message by using the first control information and the message.

5. The data transmission method of communication nodes of the claim 1, further comprising a step for sharing a second control information for increasing the entropy of the first control information with the participating communication nodes.

6. The data transmission method of communication nodes of the claim 5, wherein in the sharing of the second control information, the transmitting side communication node performs,
receiving the second control information from a service provider among the participating communication nodes, or
generating the second control information and transmitting the second control information to the participating communication nodes.

7. The data transmission method of communication nodes of the claim 6, wherein the second control information includes,
at least any one of a seed value encrypted with a private key of any one of the participating communication nodes that provided a seed value;
a public key of one communication node among the participating communication nodes that provided the seed value;
a second nonce value generated by using the seed value;
a second timestamp value for transmission of the second control information;
a public key of a service provider; and
the second nonce value encrypted with the public key of the service provider.

8. The data transmission method of communication nodes of the claim 1, wherein the message includes at least any one of,
a public key of the transmitting side communication node;
a first timestamp value for the first control information;
a second timestamp value for transmission of second control information corresponding to an entropy of the first control information;
a value indicating whether it is the second control information provided by a service provider;
a sequence starting number value for transmission of the segment of data;
a sequence ending number value for transmission of the segment of data;
a sequence number of the segment of data;
a first nonce value generated by the transmitting side communication node or a second nonce value of the second control information; and
the data or segments of the data.

9. The data transmission method of communication nodes of the claim 1, further comprising a step for dividing the data into a plurality of segments when the size of the data to be transmitted is larger than or equal to a threshold in the transmitting side communication node.

10. The data transmission method of communication nodes of the claim 1, wherein if there is no data to be transmitted, the information for the transmitting side communication node to verify the authentication and integrity of the data to be transmitted includes a null value.

11. The data transmission method of communication nodes of the claim 1, further comprising a step for the receiving side communication node to perform authentication on the transmitting side communication node which issued the first control information by using the first control information and the message.

12. The data transmission method of communication nodes of the claim 1, wherein the first control information is transmitted periodically or in a specific transmission pattern to at least one or more participating communication nodes including the transmitting side communication node through a channel formed in the block chain network.

13. A communication node wherein a first communication node and a second communication nodes are connected to each other on a network, and the first communication node comprises a memory and at least one processor, and
wherein the processor is configured to check the presence or absence of data to be transmitted to the second communication node, allow the first communication node to generate a first control information for verifying authentication and integrity of the data to be transmitted, share the first control information with at least one or more participating communication node including the second communication node through a channel formed in a block chain network, and transmits a message including the data through a channel formed in another network that is different from the block chain network,
wherein the first control information includes;
a public key of the first communication node;
a first nonce value encrypted with a private key of the first communication node;
a first timestamp value for the first control information; and
an output value of a hash function having the data or segment of the data, the first nonce value, and a second nonce value included in a second control information for increasing entropy of the first control information as an input value.

14. A communication node wherein a first communication node and a second communication nodes are connected to each other on a network, and the second communication node comprises a memory and at least one processor, and
wherein the processor is configured to share a first control information for verifying authentication and integrity of data with at least one or more participating communication node including the first communication node through a channel formed in the block chain network, receive a message including the data from the first communication node, which is any one of the at least one or more participating communication nodes, though a channel formed in another network which is different from a block chain network and verify integrity of the data by using the first control information,
wherein the first control information includes;
a public key of the first communication node;
a first nonce value encrypted with a private key of the first communication node;
a first timestamp value for the first control information; and
an output value of a hash function having the data or segment of the data, the first nonce value, and a second nonce value included in a second control information for increasing entropy of the first control information as an input value.

15. A communication node that is a service provider between a first communication node and a second communication node connected to each other on a network comprising a memory and at least one processor, and
wherein the processor is configured to receive a first seed value for generating a random number from the first communication node or the second communication node, generate a second control information for verifying data authentication and integrity by using the first seed value and, share a second control information with a plurality of participating communication nodes including the first communication node and the second communication node through a channel formed in a block chain network,
wherein the second control information includes,
a second seed value encrypted with a private key of one communication node among the participating communication nodes that provided the first seed value;
a public key of one communication node among the participating communication nodes that provided the first seed value;
a second nonce value generated by using the first seed value;
a second timestamp value for transmission of the second control information;
a public key of a service provider; and
the second nonce value encrypted with the public key of the service provider.

16. A collaborative system comprising:
a first communication node which is configured to checks data to be transmitted, to generate a first control information for verifying authentication and integrity of the data, to share the first control information with at least one or more participating communication nodes through a channel formed in a block chain network, and to transmit a message including the data through a channel formed in other network different from the block chain network;
a second communication node which is configured to share the first control information for verifying authentication and integrity of data with at least one or more participating communication nodes through a channel formed in the block chain network, to receive a message including the data from the first communication node, which is any one of the at least one or more participating communication node, through a channel formed in other network different from the block chain network, and to perform a process for verifying the integrity of the data by using the first control information;
a third communication mode which is configured to receive a seed value for generating a random number from the first communication node or the second communication node, and to use the seed value to generate second control information for verifying the integrity of the network, and to share the second control information with a plurality of participating communication nodes including the first communication node and the second communication node through a channel formed in the block chain network.

17. The collaborative system of the claim 16, wherein the first control information includes,
a public key of the first communication node;
a first nonce value encrypted with a private key of the first communication node;
a first timestamp value for the first control information; and
an output value of a hash function having a second nonce value included in the data or segment of the data, the first nonce value, and a second nonce value included in the second control information for increasing the entropy of the first control information as an input value.

18. The collaborative system of the claim 16, wherein the second control information includes at least any one of,
a seed value encrypted with a private key of any one of the participating communication nodes that provided the seed value;
a public key of any one communication node among the participating communication nodes that provided the seed value;
a second nonce value generated by using the seed value;
a second timestamp value for transmission of the second control information;
a public key of the service provider; and
the second nonce value encrypted with the public key of the service provider.

19. The collaborative system of the claim 16, wherein the message includes at least any one of,
a public key of the first communication node;
a first timestamp value for the first control information;
a second timestamp value for transmission of second control information corresponding to an entropy of the first control information;
a value indicating whether it is the second control information provided by a service provider;
a sequence starting number value for transmission of a segment of data;
a sequence ending number value for transmission of the segment of data;
a sequence number of the segment of data;
a first nonce value generated by the first communication node or a second nonce value of the second control information; and
the data or the segment of the data.

* * * * *